(12) United States Patent
Davis

(10) Patent No.: US 9,899,878 B2
(45) Date of Patent: Feb. 20, 2018

(54) SYSTEMS AND METHODS FOR INDUCTION CHARGING WITH A CLOSED MAGNETIC LOOP

(71) Applicant: QUALCOMM Incorporated, San Diego, CA (US)

(72) Inventor: Roy Howard Davis, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 272 days.

(21) Appl. No.: 14/832,261

(22) Filed: Aug. 21, 2015

(65) Prior Publication Data

US 2015/0364929 A1 Dec. 17, 2015

Related U.S. Application Data

(63) Continuation of application No. 13/427,726, filed on Mar. 22, 2012, now Pat. No. 9,118,203.

(Continued)

(51) Int. Cl.
*H01F 37/00* (2006.01)
*H01F 38/14* (2006.01)
(Continued)

(52) U.S. Cl.
CPC .............. *H02J 50/12* (2016.02); *H01F 38/14* (2013.01); *H02J 5/005* (2013.01); *H02J 7/025* (2013.01);
(Continued)

(58) Field of Classification Search
CPC . H02J 5/005; H02J 7/025; H02J 17/00; H01F 38/14; H01F 27/42; H01F 37/00;
(Continued)

(56) References Cited

U.S. PATENT DOCUMENTS 7,521,890 B2 4/2009 Lee et al.
7,952,322 B2 5/2011 Partovi et al.
(Continued)

FOREIGN PATENT DOCUMENTS

CN 101375483 A 2/2009
CN 101836272 A 9/2010
(Continued)

OTHER PUBLICATIONS

International Search Report and Written Opinion—PCT/US2012/063714—ISA/EPO—dated Feb. 25, 2013.

*Primary Examiner* — Hal Kaplan
(74) *Attorney, Agent, or Firm* — Knobbe, Martes, Olson & Bear, LLP

(57) ABSTRACT

In one aspect, an apparatus for wireless power transmission comprises a plurality of coils and a controller. The controller is configured to sequentially energize each coil of the plurality of coils to produce a magnetic field. The controller is configured to select a subset of the plurality of coils based on a measure of coupling between each coil of the subset of the plurality of coils and at least one receiver coil of a chargeable device. The controller is configured to sequentially energize pairs of coils selected from the subset of the plurality of coils. The controller is configured to select at least two coils from the subset of the plurality of coils for wireless power transmission based on a measure of coupling between each of the pairs of coils and the at least one receiver coil of the chargeable device.

20 Claims, 22 Drawing Sheets

Related U.S. Application Data

(60) Provisional application No. 61/560,135, filed on Nov. 15, 2011.

(51) Int. Cl.

| | | |
|---|---|---|
| *H02J 17/00* | (2006.01) | |
| *H02J 50/12* | (2016.01) | |
| *H02J 50/40* | (2016.01) | |
| *H02J 50/90* | (2016.01) | |
| *H02J 50/70* | (2016.01) | |
| *H02J 50/60* | (2016.01) | |
| *H02J 5/00* | (2016.01) | |
| *H02J 7/02* | (2016.01) | |
| *H01F 27/42* | (2006.01) | |

(52) U.S. Cl.
CPC ............ *H02J 17/00* (2013.01); *H02J 50/40* (2016.02); *H02J 50/60* (2016.02); *H02J 50/70* (2016.02); *H02J 50/90* (2016.02); *H01F 27/42* (2013.01); *H01F 37/00* (2013.01)

(58) Field of Classification Search
CPC ............ H01F 2038/143–2038/346; H04B 5/0025–5/0093; B60L 11/182; B60L 11/1829–11/1831; Y02T 90/122; A61B 1/00029; A61N 1/3787
USPC .......................................... 307/104; 320/108
See application file for complete search history.

(56) References Cited

U.S. PATENT DOCUMENTS

| | | | |
|---|---|---|---|
| 8,159,183 | B2 | 4/2012 | Choi et al. |
| 8,587,154 | B2 | 11/2013 | Fells et al. |
| 9,118,203 | B2 | 8/2015 | Davis |
| 2010/0141369 | A1 | 6/2010 | Mori |
| 2010/0253281 | A1 | 10/2010 | Li |
| 2010/0289341 | A1 | 11/2010 | Ozaki et al. |
| 2011/0025133 | A1 | 2/2011 | Sauerlaender et al. |
| 2011/0184842 | A1 | 7/2011 | Melen |
| 2011/0210617 | A1 | 9/2011 | Randall |
| 2011/0291491 | A1 | 12/2011 | Lemmens et al. |
| 2014/0042824 | A1 | 2/2014 | Fells et al. |

FOREIGN PATENT DOCUMENTS

| | | |
|---|---|---|
| JP | H10233235 A | 9/1998 |
| JP | H1197262 A | 4/1999 |
| JP | 2002170725 A | 6/2002 |
| JP | 2009525715 A | 7/2009 |
| JP | 2010538596 A | 12/2010 |
| JP | 2011199975 A | 10/2011 |
| WO | WO-0195432 A1 | 12/2001 |
| WO | WO-2009027674 A1 | 3/2009 |
| WO | WO-2010093719 | 8/2010 |

SYSTEMS AND METHODS FOR INDUCTION CHARGING WITH A CLOSED MAGNETIC LOOP

CROSS REFERENCE TO RELATED APPLICATIONS

This application is a continuation of U.S. patent application Ser. No. 13/427,726, filed on Mar. 22, 2012, which claims priority under 35 U.S.C. § 119(e) to U.S. Provisional Patent Application No. 61/560,135, filed on Nov. 15, 2011. The disclosures of the aforementioned prior applications are hereby incorporated by reference.

FIELD

The present invention relates generally to wireless power. More specifically, the disclosure is directed to induction charging with a closed magnetic loop.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY OF THE INVENTION

One aspect of this disclosure provides an apparatus for wireless power transmission. The apparatus comprises a plurality of coils and a controller. The controller is configured to sequentially energize each coil of the plurality of coils to produce a magnetic field. The controller is configured to select a subset of the plurality of coils based on a measure of coupling between each coil of the subset of the plurality of coils and at least one receiver coil of a chargeable device. The controller is configured to sequentially energize pairs of coils selected from the subset of the plurality of coils. The controller is configured to select at least two coils from the subset of the plurality of coils for wireless power transmission based on a measure of coupling between each of the pairs of coils and the at least one receiver coil of the chargeable device.

Another aspect of this disclosure provides a method for wireless power transmission. The method comprises sequentially energizing each coil of a plurality of coils to produce a magnetic field. The method comprises selecting a subset of the plurality of coils based on a measure of coupling between each coil of the subset of the plurality of coils and at least one receiver coil of a chargeable device. The method comprises sequentially energizing pairs of coils selected from the subset of the plurality of coils. The method comprises selecting at least two coils from the subset of the plurality of coils for wireless power transmission based on a measure of coupling between each of the pairs of coils and the at least one receiver coil of the chargeable device.

One aspect of this disclosure provides an apparatus for wireless power transmission. The apparatus comprises means for sequentially energizing each coil of a plurality of coils to produce a magnetic field. The apparatus comprises means for selecting a subset of the plurality of coils based on a measure of coupling between each coil of the subset of the plurality of coils and at least one receiver coil of a chargeable device. The apparatus comprises means for sequentially energizing pairs of coils selected from the subset of the plurality of coils. The apparatus comprises means for selecting at least two coils from the subset of the plurality of coils for wireless power transmission based on a measure of coupling between each of the pairs of coils and the at least one receiver coil of the chargeable device.

Another aspect of this disclosure provides a non-transitory, computer-readable medium comprising code that, when executed, causes an apparatus for wireless power transmission to sequentially energize each coil of a plurality of coils to produce a magnetic field. The code, when executed further causes the apparatus to select a subset of the plurality of coils based on a measure of coupling between each coil of the subset of the plurality of coils and at least one receiver coil of a chargeable device. The code, when executed further causes the apparatus to sequentially energize pairs of coils selected from the subset of the plurality of coils. The code, when executed further causes the apparatus to select at least two coils from the subset of the plurality of coils for wireless power transmission based on a measure of coupling between each of the pairs of coils and the at least one receiver coil of the chargeable device.

DETAILED DESCRIPTION

The detailed description set forth below in connection with the appended drawings is intended as a description of exemplary implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the invention. The exemplary implementations of the invention may be practiced without these specific details. In some instances, well-known structures and devices are shown in block diagram form in order to avoid obscuring the novelty of the exemplary implementations presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

Figure 1:
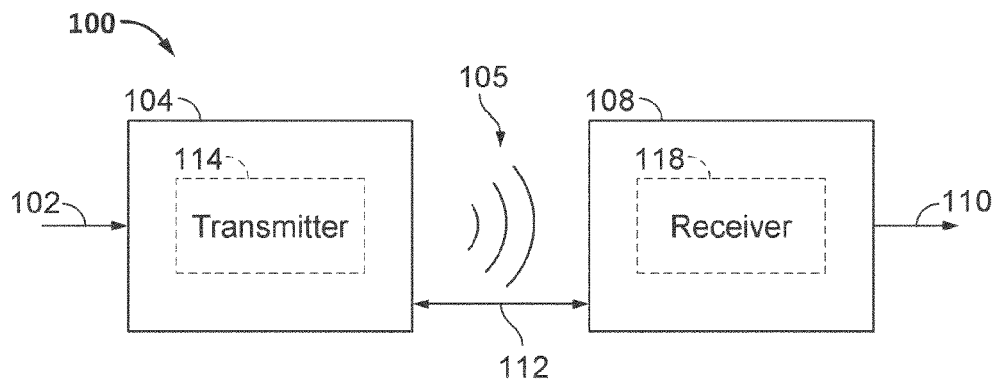
FIG. 1 is a functional block diagram of a wireless power transfer system, in accordance with some implementations.

FIG. 1 is a functional block diagram of a wireless power transfer system 100, in accordance with some implementations. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary implementation, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
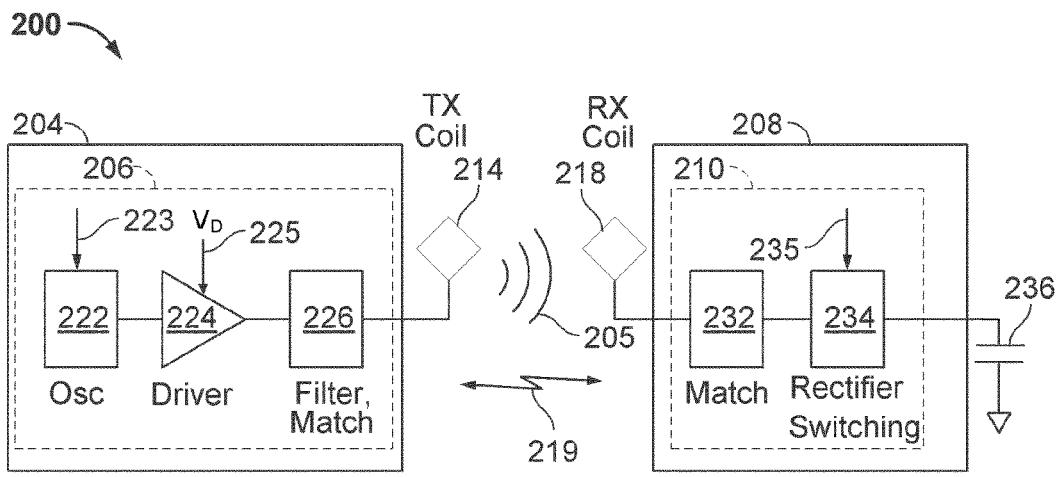
FIG. 2 is a functional block diagram of components that may be used in the wireless power transfer system of FIG. 1, in accordance with some implementations.

FIG. 2 is a functional block diagram 200 of exemplary components that may be used in the wireless power transfer system 100 of FIG. 1, in accordance with some implementations. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. The driver circuit 224 may also be provided with a drive signal 225 having a voltage $V_D$ that is configured to control the maximum power that may be delivered through the transmit circuitry 206. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

As described more fully below, receiver 208, that may initially have an associated load (e.g., battery 236) that is able to be selectively disabled, may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some implementations, a receiver 208 may be configured to directly utilize power received from a wireless power transfer field without charging of a battery 236. For example, a communication device, such as a near-field communication (NFC) or radio-frequency identification device (RFID) may be configured to receive power from a wireless power transfer field and communicate by interacting with the wireless power transfer field and/or utilize the received power to communicate with a transmitter 204 or other devices.

Figure 3:
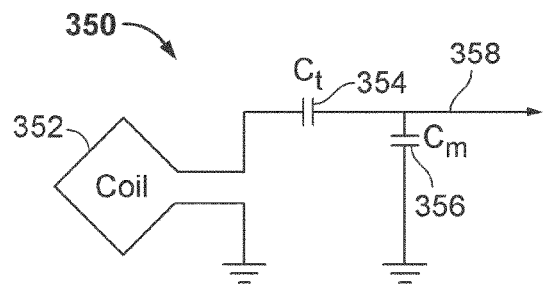
FIG. 3 is a schematic diagram of a portion of transmit circuitry or receive circuitry of FIG. 2 including a transmit or receive coil, in accordance with some implementations.

FIG. 3 is a schematic diagram of a portion of transmit circuitry 206 or receive circuitry 210 of FIG. 2 including a transmit or receive coil 352, in accordance with some implementations. As illustrated in FIG. 3, transmit or receive circuitry 350 used in exemplary implementations may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As an example, capacitor 356 and capacitor 354 may be added to the transmit or receive circuitry 350 to create a resonant circuit that selects a signal 358 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another example, a capacitor may be placed in parallel between the two terminals of the coil 350. For transmit coils, a signal 358 with a frequency that substantially corresponds to the resonant frequency of the coil 352 may be an input to the coil 352.

In one implementation, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
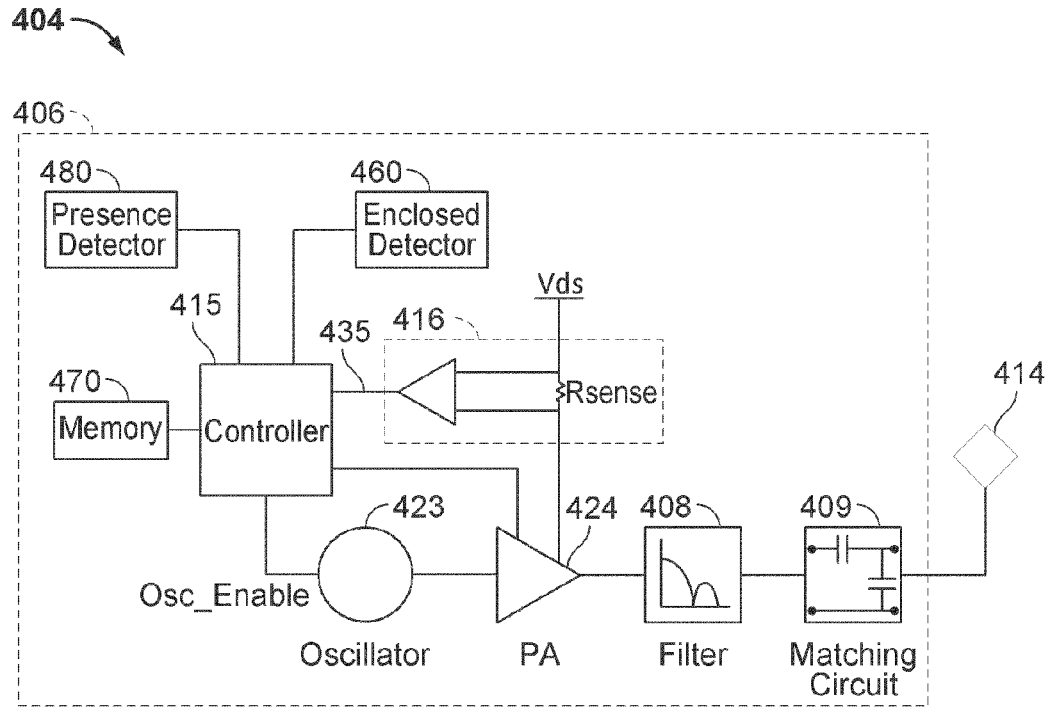
FIG. 4 is a functional block diagram of a transmitter that may be used in the wireless power transfer system of FIG. 1, in accordance with some implementations.

FIG. 4 is a functional block diagram of a transmitter 404 that may be used in the wireless power transfer system of FIG. 1, in accordance with some implementations. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary implementations may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. A RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. The controller 415 may be coupled to a memory circuit 470. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. The load sensing circuit 416 provides an output signal 435 to the controller 415. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. A implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As an example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another example, the presence detector 480 may be a detector capable of detecting a human by infrared detection, motion detection, or other suitable means. In some exemplary implementations, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As an example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary implementations, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As an example, the time interval may be longer than that needed to fully charge a specific type of wireless device under the assumption of the device being initially fully discharged.

Figure 5:
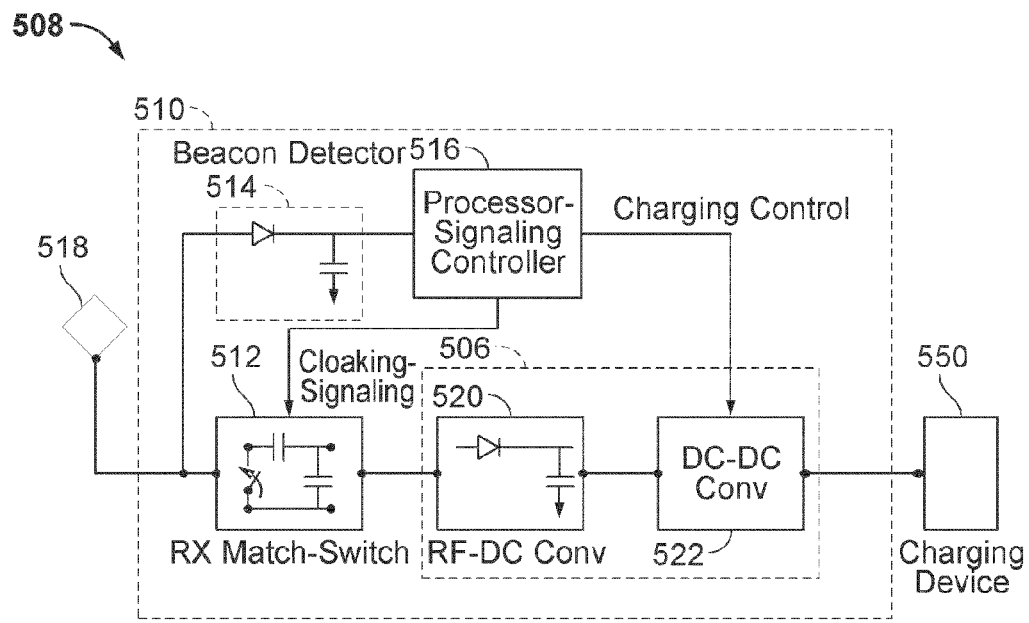
FIG. 5 is a functional block diagram of a receiver that may be used in the wireless power transfer system of FIG. 1, in accordance with some implementations.

FIG. 5 is a functional block diagram of a receiver 508 that may be used in the wireless power transfer system of FIG. 1, in accordance with some implementations. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by Vrect. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an implementation, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
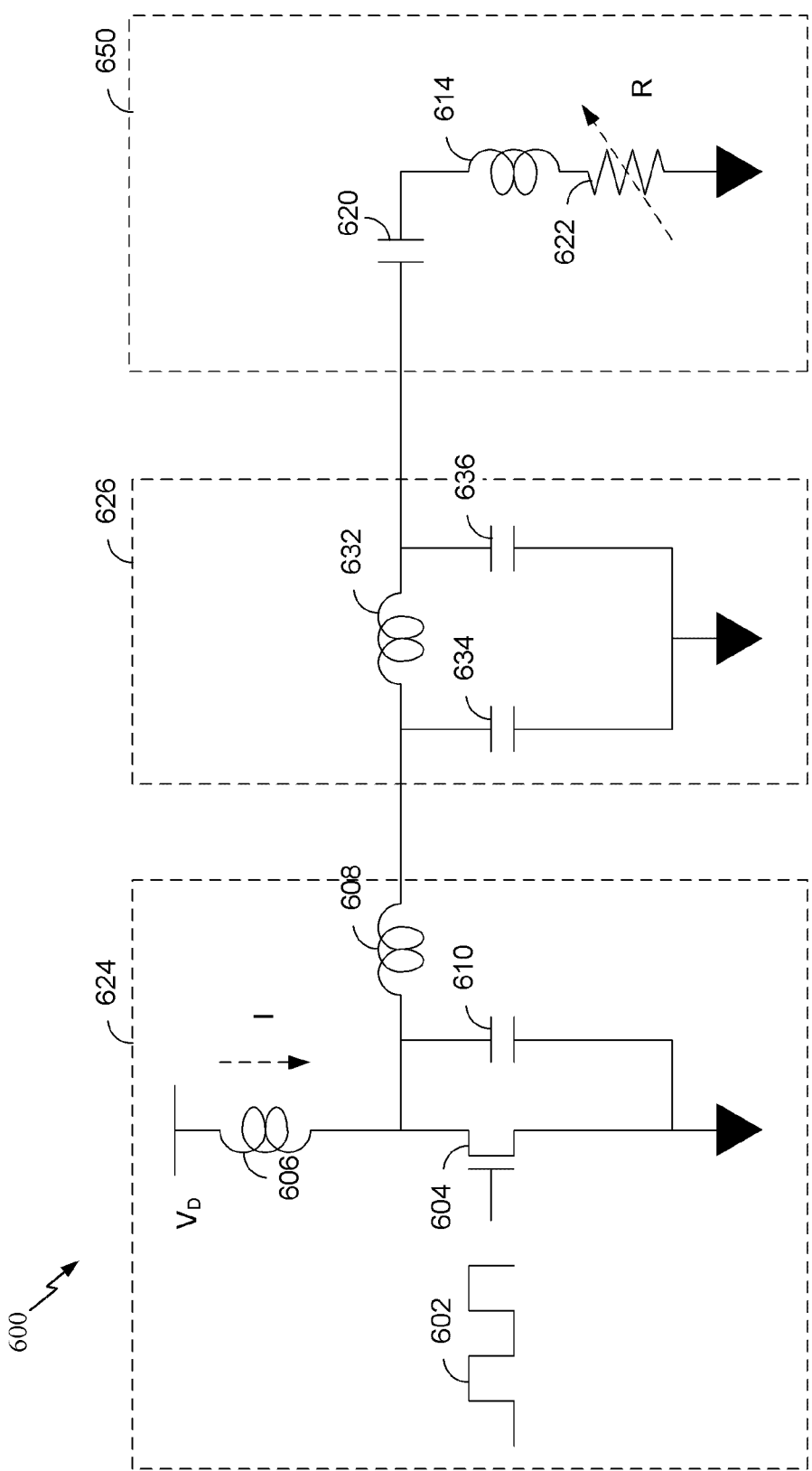
FIG. 6 is a schematic diagram of a portion of transmit circuitry that may be used in the transmit circuitry of FIG. 4, in accordance with some implementations.

FIG. 6 is a schematic diagram of a portion of transmit circuitry 600 that may be used in the transmit circuitry 406 of FIG. 4, in accordance with some implementations. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with implementations of the invention. The driver circuit 624 may be driven by driving a switch 604 with an input signal 602 from an oscillator 423 as shown in FIG. 4. The driver circuit 624 may also be provided with a drive voltage $V_D$ that is configured to control the maximum power that may be delivered through a transmit circuit 650. The drive voltage $V_D$ may be provided to a first terminal of an inductor 606. A second terminal of the inductor 606 is connected to a first terminal of each of the switch 604, a capacitor 610 connected across the switch 604, and an inductor 608. A second terminal of the inductor 608 provides an output to a filter circuit 626, which may be included in the transmit circuitry 600 to eliminate or reduce harmonics. The filter circuit 626 may be a three pole (capacitor 634, inductor 632, and capacitor 636) low pass filter circuit 626.

The signal output by the filter circuit 626 may be provided to a transmit circuit 650 comprising a coil 614. The transmit circuit 650 may include a series resonant circuit having a capacitance 620 and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Figure 7:
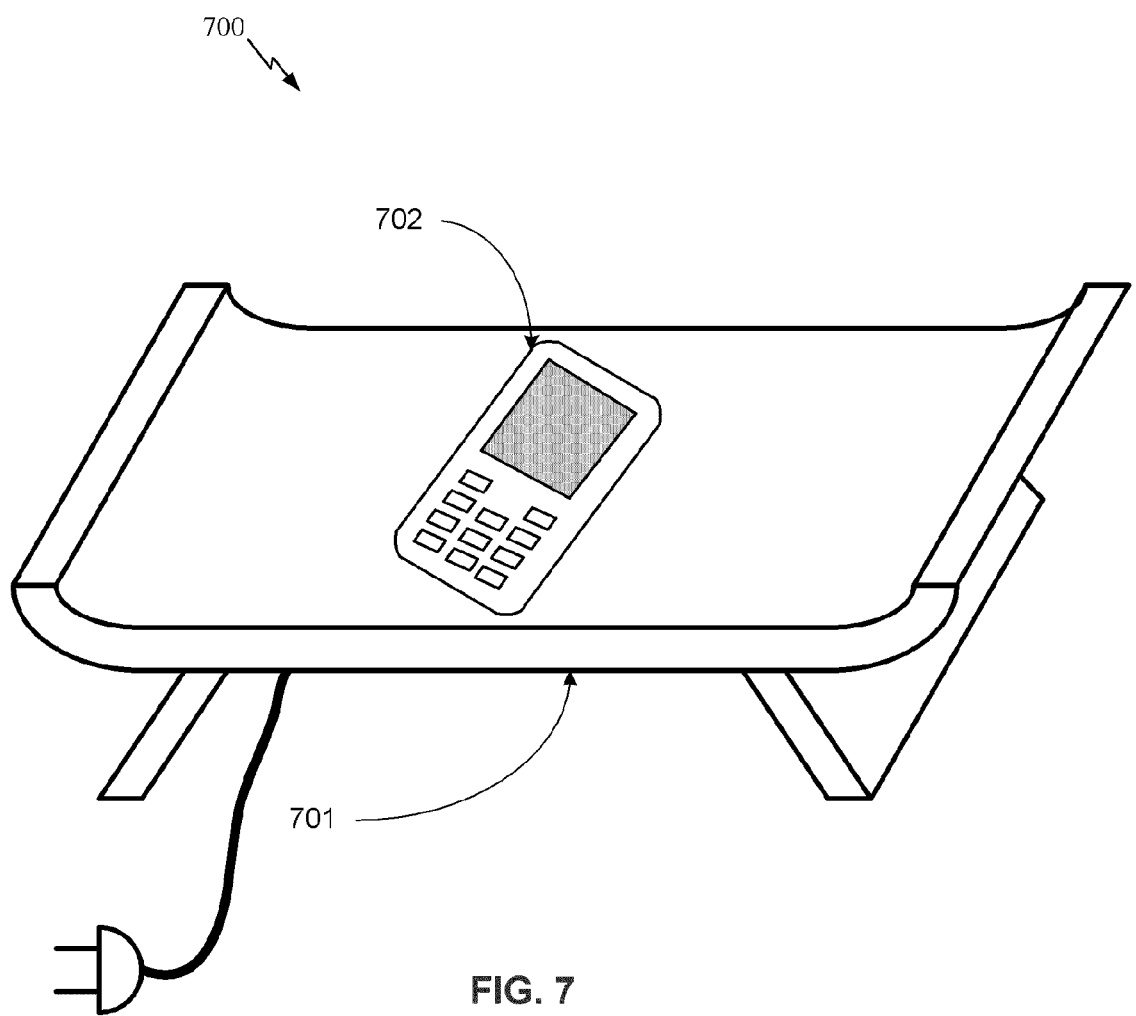
FIG. 7 is a wireless communication system in which aspects of the present disclosure may be employed, in accordance with some implementations.

FIG. 7 is a wireless communication system 700 in which aspects of the present disclosure may be employed, in accordance with some implementations. The wireless communication system 700 may include a charging pad 701 and a device 702 that may be wirelessly charged.

The charging pad 701 may be plugged into utility power and configured to couple power wirelessly to the device 702 to be charged. The charging pad 700 may be connected to the mains utility power and configured to convert the mains 50/60 Hertz current to a higher frequency ranging from hundreds of Hertz into the Megahertz. In other aspects, the charging pad 701 may convert power to a frequency below hundreds of Hertz or to a frequency above one Megahertz. In some aspects, the power output of the charging pad 701 may range from a few Watts to approximately 100 Watts. In other aspects, the power output may range below a few Watts or above approximately 100 Watts.

Although the charging pad 701 and the device 702 may be depicted in this configuration, numerous other configurations with different shapes, sizes, and orientations are envisioned and within the spirit of this disclosure. As examples, the charging pad surface may be located on an item such as a refrigerator or built within part of a surface such as a kitchen countertop. In other examples, the charging pad 701 surface may be orientated horizontally such as depicted or vertically such as along or within a wall. The device 702 could be a smart phone, tablet computer, laptop computer, or television, among other possibilities.

Figure 8:
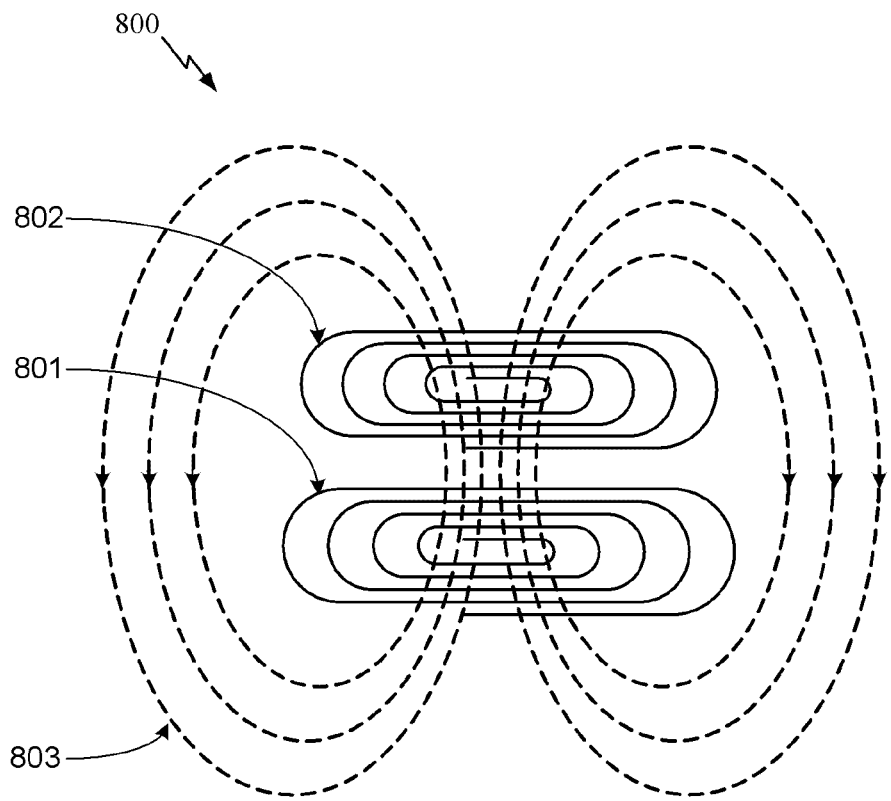
FIG. 8 illustrates a side view of a coil-to-coil coupling system, in accordance with some implementations.

FIG. 8 illustrates a side view of a coil-to-coil coupling system 800, in accordance with some implementations. The coil-to-coil coupling system 800 may include a primary coil 801 and a secondary coil 802. The manner of coupling power wirelessly may be by magnetic coupling of a high frequency alternating current.

In some aspects, the primary coil 801 may be contained in the charging pad and energized by the utility mains via electronics also contained in the charging pad.

In some aspects, the secondary or pickup coil 802 may be contained in the device 702 to be wirelessly charged. The magnetic field emanating from the primary coil 801 may induce a high frequency alternating current in the secondary coil 802, which may be rectified and regulated to charge the battery in the portable device.

The flux lines 803 of the magnetic field may be concentrated in the center of the coils in the area between the coils. The flux lines may connect to complete the path from one pole of the magnetic field to the other pole. The return path for the flux may be around the periphery of the coils. Even with the primary coil 801 and the secondary coil 802 nearby, there may be a large air gap that the flux lines may traverse, so the flux may leak into the volume surrounding the coils.

Coupling between the primary coil 801 and secondary coil 802 may be increased by making each coil resonate with a capacitor, forming two resonant tank circuits. The increase may be understood in terms of a quality factor or Q factor, which may be a dimensionless parameter that describes the dampened state of an oscillator or resonator. Increasing the operating Q factor of resonant circuits may increase the coupling.

Figure 9:
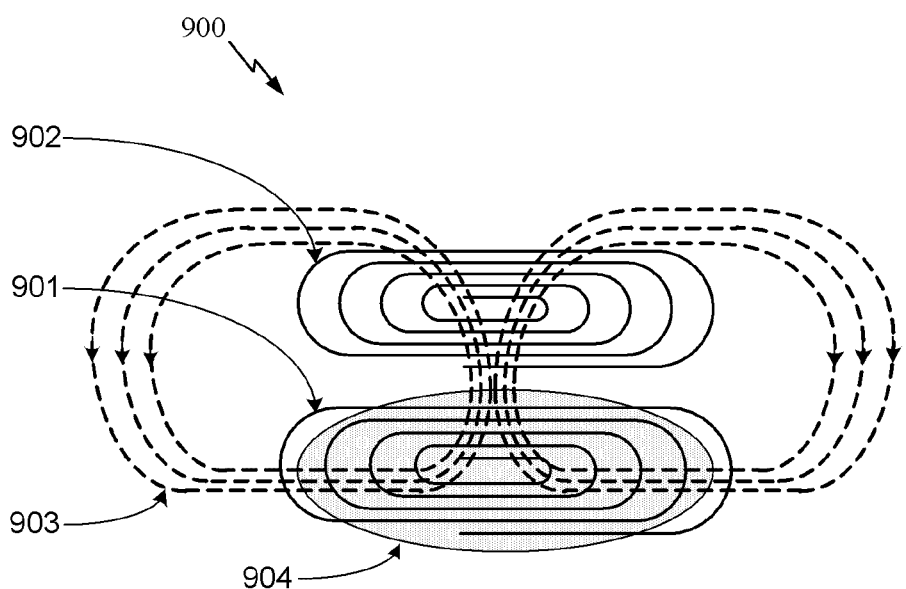
FIG. 9 illustrates a side view of another coil-to-coil coupling system, in accordance with some implementations.

FIG. 9 illustrates a side view of another coil-to-coil coupling system 900, in accordance with some implementations. The coil-to-coil coupling system 900 may include a primary coil 901, a secondary coil 902, and a backing 904. The manner of coupling power wirelessly may be by magnetic coupling of a high frequency alternating current. The flux lines 903 of the magnetic field are depicted.

The backing 904 may improve the coupling between primary coil 901 and secondary coil 902. The backing 904 may be composed of material with low magnetic permeability, such as ferrite. In FIG. 9, the backing 904 is shown for the primary coil 901. In some aspects, this configuration may afford a low resistance path for the magnetic flux lines to be concentrated under the primary coil 901 and may avoid coupling energy into an object under the charging pad 701. In yet other aspects, a second backing may be used near or above the secondary coil 902. In aspects where backing may be placed both above and below the coils 901 and 902, the magnetic field may be compressed in the vertical direction and may spill out around the edge of the coils.

Figure 10:
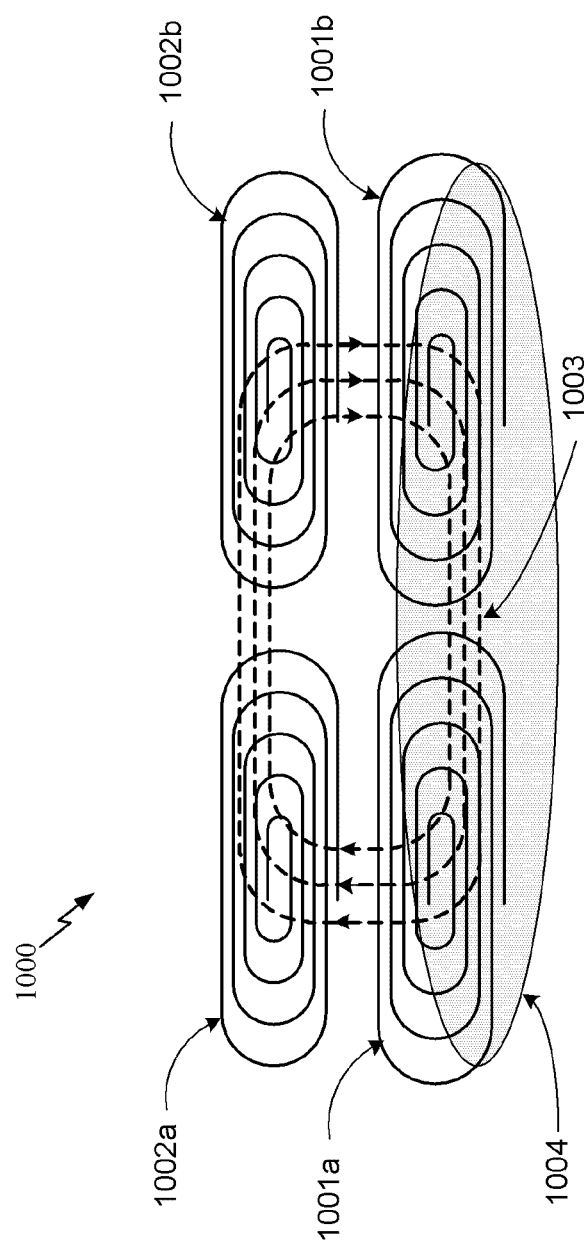
FIG. 10 illustrates a side view of a dual coil coupling system, in accordance with some implementations.

FIG. 10 illustrates a side view of a dual coil coupling system 1000, in accordance with some implementations. The dual coil coupling system 1000 may include primary coils 1001a and 1001b, secondary coils 1002a and 1002b, and a backing 1004. The manner of coupling power wirelessly may be by magnetic coupling of a high frequency alternating current.

The primary coils 1001a and 1001b may be adjacent and coplanar. The primary coil 1001a may be counter-wound or connected in opposite polarity from primary coil 1001b such that when the field in the upward direction from one coil is the north pole, the field upward from the other is the south pole.

The secondary coils 1002a and 1002b may be similarly adjacent and coplanar. In some aspects, the center-to-center spacing between the secondary coils 1002a and 1002b may be approximately the same as between the primary coils 1001a and 1001b. In other aspects, the primary coils 1001a and 1001b may be in the charging pad 701, and the secondary coils 1002a and 1002b may be in the device 702.

A backing 1004 may be located below the primary coils 1001a and 1001b. A second backing (not shown) may be located above the second coils 1002a and 1002b. The backing 1004 or second backing may be composed of material such as ferrite. In some aspects, the combination of primary coils 1001a and 1001b, secondary coils 1002a and 1002b, and the ferrite backings may provide a low permeability magnetic path for the flux lines 1003 to complete the circuit emanating from one primary coil 1001a, concentrated into the center of the opposing secondary coil 1002a, through the second backing, through the second secondary coil 1002b, concentrated into the center of the other primary coil 1001b, and completing the circuit through the backing 1004. This magnetic circuit may provide coupling with separation of the primary coils 1001a and 1001b to the secondary coils 1002a and 1002b while low coupling to nearby circuits or objects.

Figure 11:
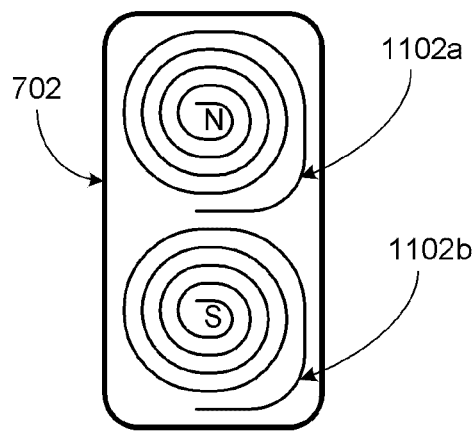
FIG. 11 is a schematic of a wirelessly chargeable device, in accordance with some implementations.

FIG. 11 is a top view of a schematic of a wirelessly chargeable device, such as the device 702 of FIG. 7, in accordance with some implementations. The device 702 may contain secondary coils 1102a and 1102b, which may be either counter-wound or connected in opposite polarity to each other. The secondary coils 1102a and 1102b may be connected either in series or parallel. The high frequency alternating magnetic flux induced by primary coils, such as primary coils 1001a and 1001b, may result in a high frequency alternating current, which may be summed from secondary coils 1102a and 1102b, rectified and regulated to power the device 702 and may charge a battery. In some aspects, the coils 1102a and 1102b may be coplanar.

Figure 12:
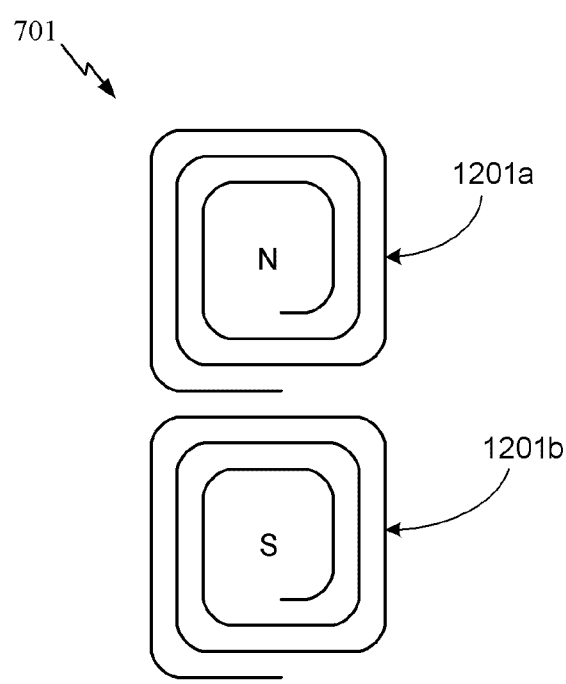
FIG. 12 is a schematic of a charging pad, in accordance with some implementations.

FIG. 12 is a top view of a schematic of a charging pad, such as the charging pad 701 of FIG. 7. The charging pad 701 may include primary coils 1201a and 1201b. In some aspects, the primary coils 1201a and 1201b may be either counter-wound or connected in opposite polarity to each other. The primary coils 1201a and 1201b may be connected either in series or parallel. The primary coils 1201a and 1201b may generate a high frequency alternating magnetic flux and result in a high frequency alternating current in secondary coils, such as secondary coils 1102a and 1102b. In some aspects, the coils 1201a and 1201b may be coplanar.

Figure 13:
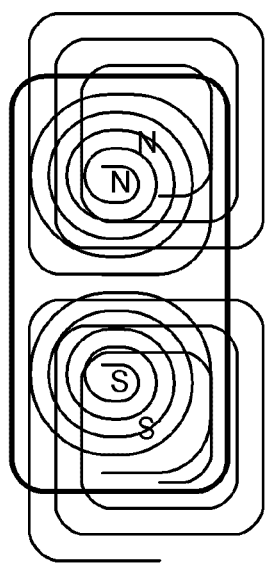
FIG. 13 is a schematic of a charging system, in accordance with some implementations.

FIG. 13 is a top view of a schematic of a charging system 1300, such as the wireless communication system 700 of FIG. 7, in accordance with some implementations. The device 702 shown in FIG. 11 is depicted laying over the primary coils 1201*a* and 1201*b* of the charging pad 701 of FIG. 12. Although the coil center-to-center distance may different between the charging pad primary coils 1201*a* and 1201*b*, and the device secondary coils 1102*a* and 1102*b* and the device 702 may be misaligned with the coils of the charging pad, a magnetic circuit may be maintained.

Figure 14:
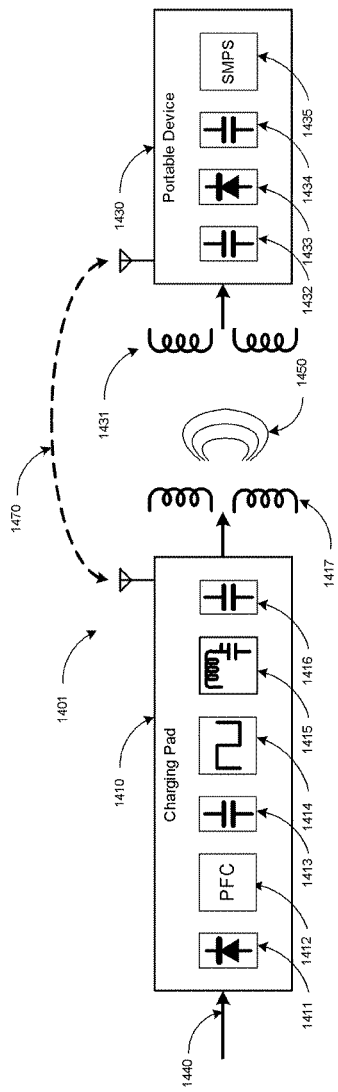
FIG. 14 is a functional block diagram of components that may be used in a wireless power system, in accordance with some implementations.

FIG. 14 is a functional block diagram of components that may be used in a wireless power system, such as the wireless power system of FIG. 7, in accordance with some implementations. The wireless power system 1401 may include a charging pad 1410 and portable device 1430. The charging pad 1410 may be connected to utility power 1440, possibly through a stand line cord that plugs into a receptacle. 50/60 Hertz AC utility current may be converted to pulsating DC current by rectifier 1411. In some aspects, a power factor correction circuit 1412 may be used. The pulsating DC current may be smoothed to constant DC by a filter 1413. The DC current may be chopped into a square wave by chopper 1414, or a similar DC to AC converter/transmitter. The current output from the chopper 1414 may be smoothed into a sine wave by filter 1415. In some aspects, filter 1415 may match the impedance of the chopper 1414 to the resonant tank circuit made up of capacitor 1416 and the primary coils 1417. Energy may be coupled from the charging pad 1410 to the portable device 1430 by an alternating magnetic field 1450. The alternating magnetic field 1450 may be coupled into the secondary coils 1431 and converted to an alternating current. Capacitor 1432 may resonate with the secondary coils 1431 to improve coupling. Rectifier 1433 may convert the alternating current to pulsating DC where it may be filtered into constant DC by capacitor 1434. Switch mode power supply 1435 may regulate the current to make it suitable to power the portable device 1430. In some aspects, a wireless communications link 1470 may be used to coordinate the charging pad and portable device, such as coordinating a charging process between the charging pad and portable device or coordinating a login process to permit or deny the portable device access to the charging pad.

Figure 15:
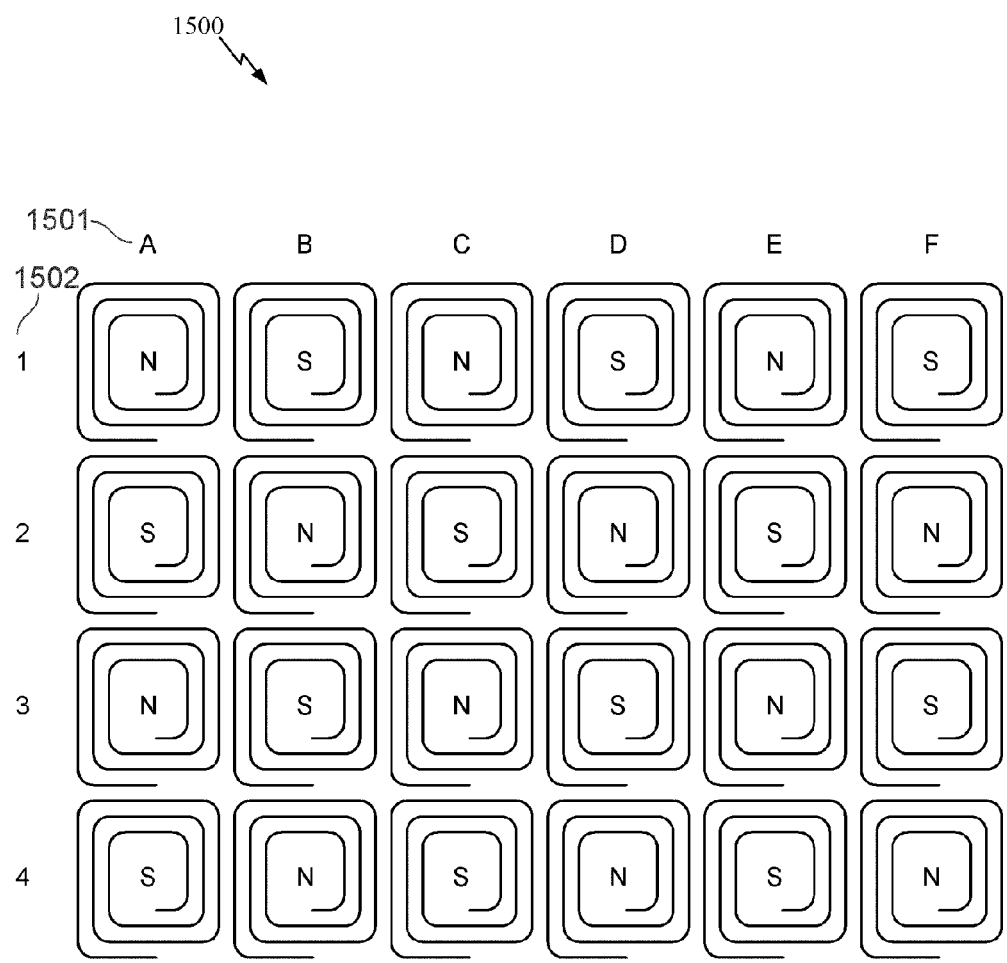
FIG. 15 is a schematic of a multi-coil charging pad that may be used in a wireless power system, in accordance with some implementations.

FIG. 15 is a schematic of a multi-coil charging pad 1500 that may be used in a wireless power system, such as the wireless power transfer system of FIG. 7, in accordance with some implementations. A number of coils may be used to enable placement of one or more portable devices on the surface of the pad. In some aspects, the coils may be placed in a grid form as shown in FIG. 15. The row 1502 and column 1501 designators are shown only for this discussion and should do not limit the number or configuration of the placement of coils. In other aspects, the coils may be placed in other numbers or configurations, including but not limited to any random, equidistant, concentric circle, or oval placement pattern. In some aspects, the coils may be coplanar and may be configured along a flat surface. In some aspects, the plane of the coils may be curved.

The coils may be formed as copper laminate on an insulating panel or circuit board, among other possibilities. In some aspects, the center-to-center spacing of the coils in the charging pad may be approximately equal to the center-to-center spacing of the coils in the portable device.

In some aspects, the charging pad 1500 coil polarity shown in FIG. 15 may be the default configuration. In yet other aspects, the default coil polarity may have some other configuration. In operation, the magnetic polarity may be alternating at a high frequency. The magnetic polarity of the individual coils may change over time and independent from one another. The coils may be wound in the same direction or are counter-wound. The magnetic polarity may be switched by reversing the electrical connection to a coil.

Figure 16:
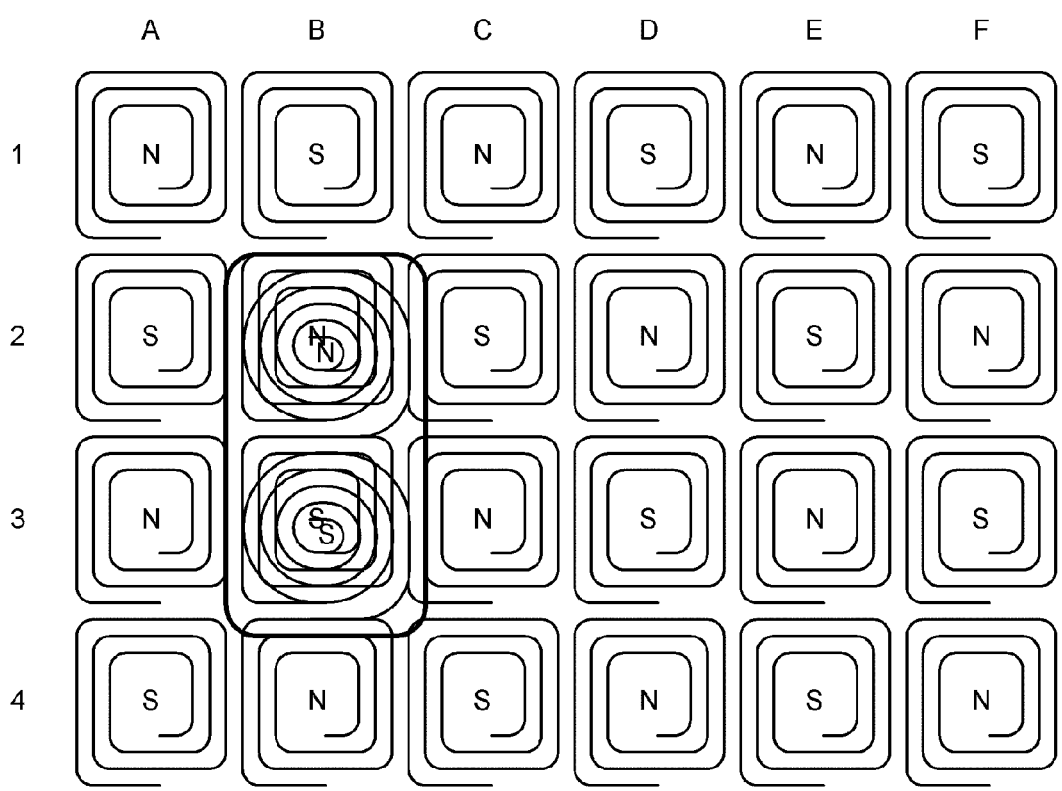
FIG. 16 is a schematic of a multi-coil charging pad and device in a wireless power system, in accordance with some implementations.

FIG. 16 is a schematic of a multi-coil charging pad and device in a wireless power system, in accordance with some implementations. FIG. 16 illustrates portable device of FIG. 11 atop the charging pad of FIG. 15 in an orientation across a short dimension of the charging pad. The charging pad coil B2 provides the north magnetic pole, and the charging pad coil B3 provides the south magnetic pole. Since the coils B2 and B3 may be tightly coupled with the coils of the portable device, the coils B2 and B3 of the charging pad may provide power. The remaining charging pad coils may not be coupled and may provide minimal power.

Figure 17:
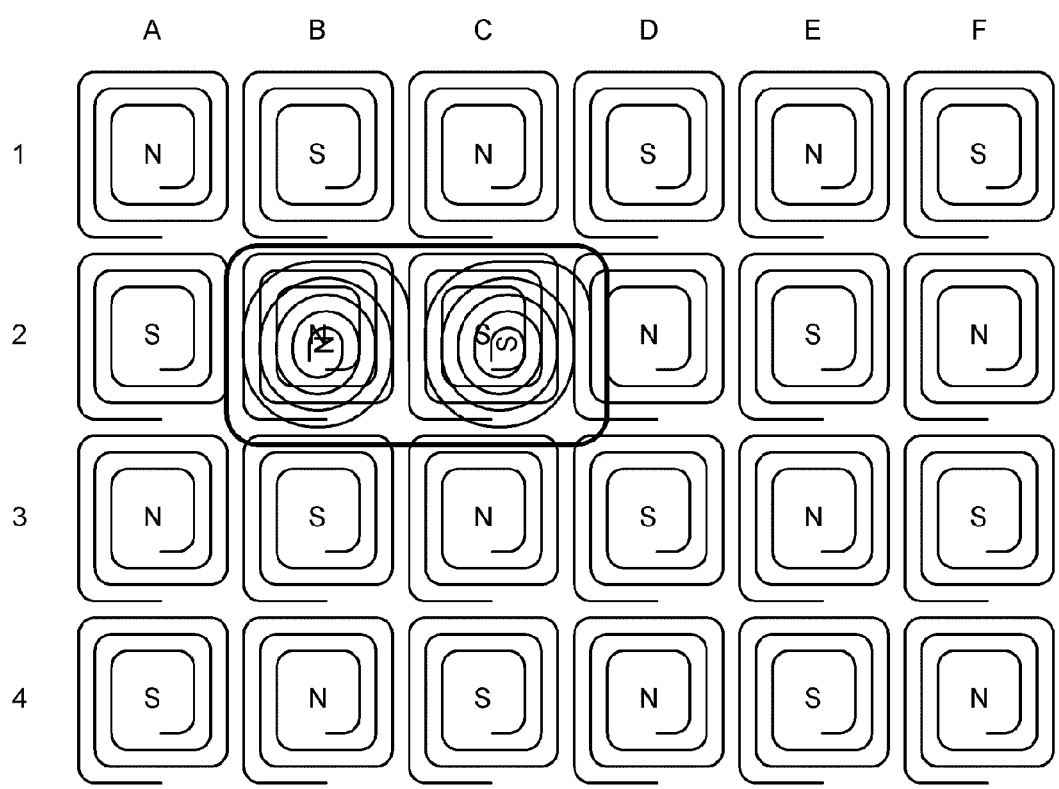
FIG. 17 is a schematic of another multi-coil charging pad and device in a wireless power system, in accordance with some implementations.

FIG. 17 is a schematic of a multi-coil charging pad and device in a wireless power system, in accordance with some implementations. FIG. 17 illustrates portable device of FIG. 11 atop the charging pad of FIG. 15 in an orientation turned at a right angle to the placement in FIG. 16. The charging pad coil B2 provides the north magnetic pole, and the charging pad coil C2 provides the south magnetic pole. Since the coils B2 and C2 may be tightly coupled with the coils of the portable device, the coils B2 and C2 of the charging pad may provide power. The remaining charging pad coils may not be coupled and may provide minimal power.

Figure 18:
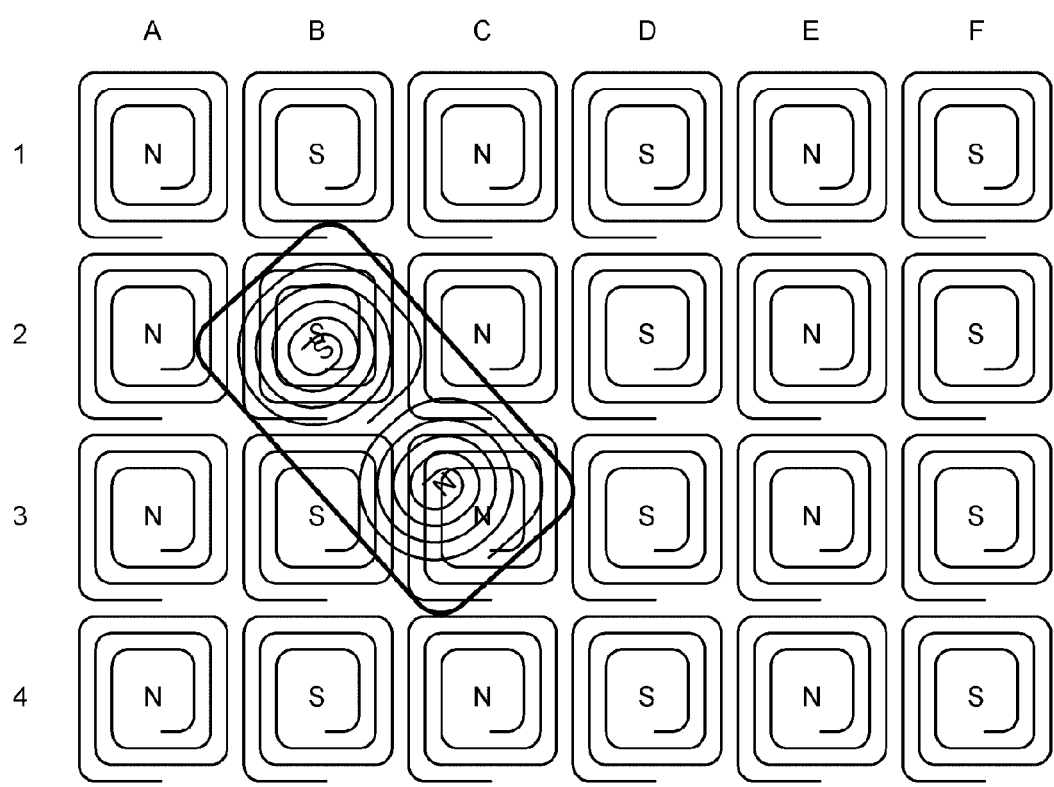
FIG. 18 is a schematic of yet another multi-coil charging pad and device in a wireless power system, in accordance with some implementations.

FIG. 18 is a schematic of a multi-coil charging pad and device in a wireless power system, in accordance with some implementations. FIG. 18 illustrates portable device of FIG. 11 atop the charging pad of FIG. 15 turned in a diagonal orientation. In this case, an alternating checkerboard pattern of coil polarity may result in the coils of the portable device lying over charging pad coils of the same polarity. In some aspects, the polarity of rows 2 and 4 may be switched so that each coil in those rows has the opposite polarity from the configuration in FIG. 15. In some aspects, the rows 2 and 4 may be switched with a single switch double pole, double throw type. In other aspects, the rows may be switched using other methods. After switching, one north and one south pole charging pad coil may be located under the diagonally placed portable device.

Figure 19:
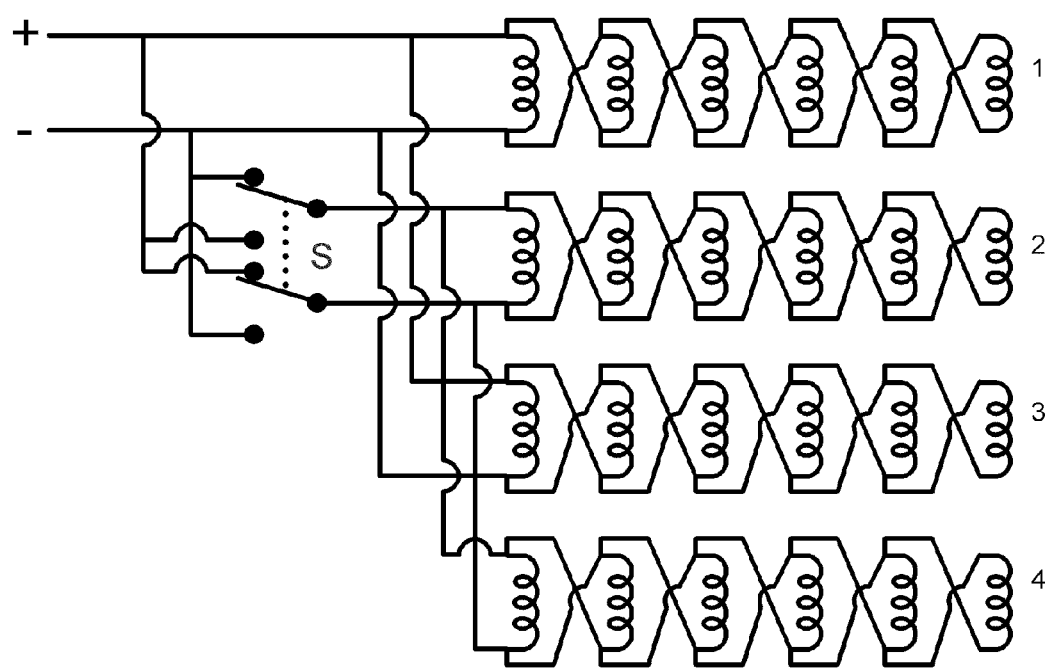
FIG. 19 is a schematic diagram of a switching circuit to change the polarity of charging pad coils, in accordance with some implementations.

FIG. 19 is a schematic diagram of a switching circuit to change the polarity of charging pad coils, in accordance with some implementations. With the double pole, double throw switch S in the upper position, the coils may be connected in the default configuration, such as the configuration shown in FIGS. 15, 16, and 17. With the double pole, double throw switch S in the lower position rows 2 and 4 have the opposite polarity shown in FIG. 18. The switch may be a mechanical switch or relay, or the switch may be any manner of electronic switch, such as a MOSFET. The decision of whether to position the switch in the upper or lower position may be made by providing short bursts of power with the switch in each position and selecting the switch position that draws the most power. In some aspects, other position sensing or power sensing schemes may be used. In some aspects, individual charging pad coils may use individual switching or sensing circuits.

Figure 20:
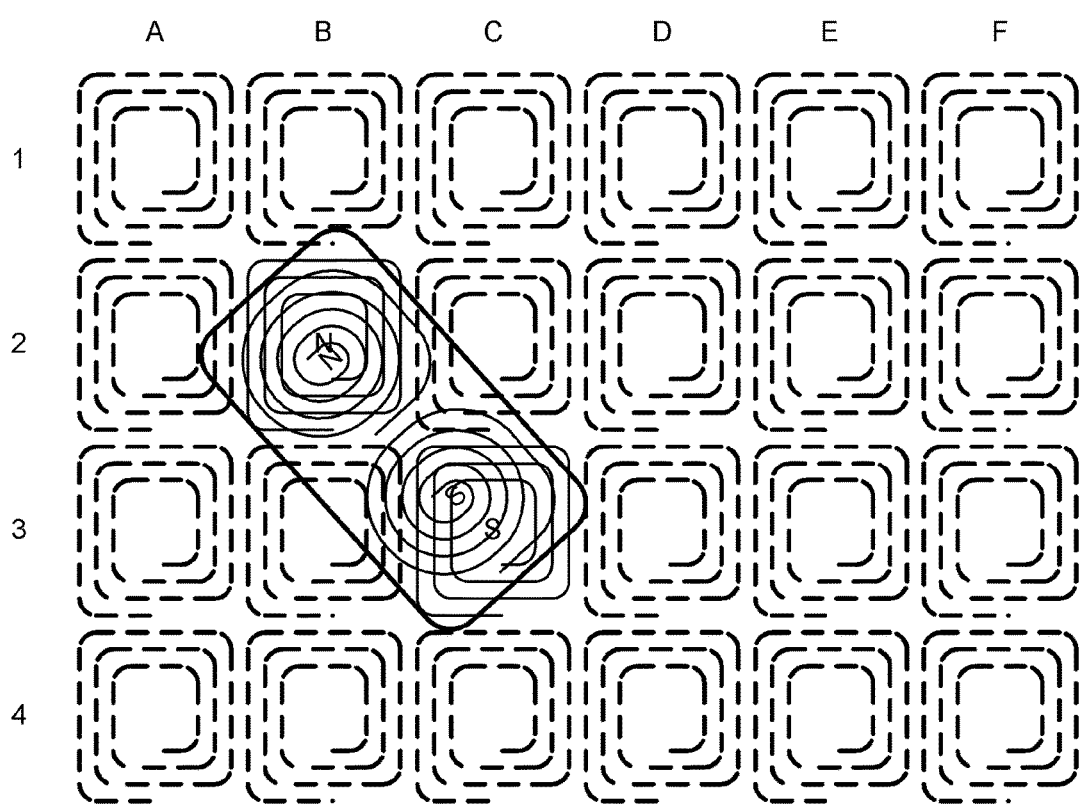
FIG. 20 is a schematic of a multi-coil charging pad and device in a wireless power system, in accordance with some implementations.

FIG. 20 is a schematic of a multi-coil charging pad and device in a wireless power system, in accordance with some implementations. Each coil of the charging pad may be individually controlled and turned on or off. Charging power may be routed to some charging pad coils. In the case shown in FIG. 20, charging pad coils B2 and C3 may provide better coupling to the portable device oriented diagonally on the charging pad. Charging pad coils B2 and C3 may be turned on while the remaining coils may be turned off.

Figure 21:
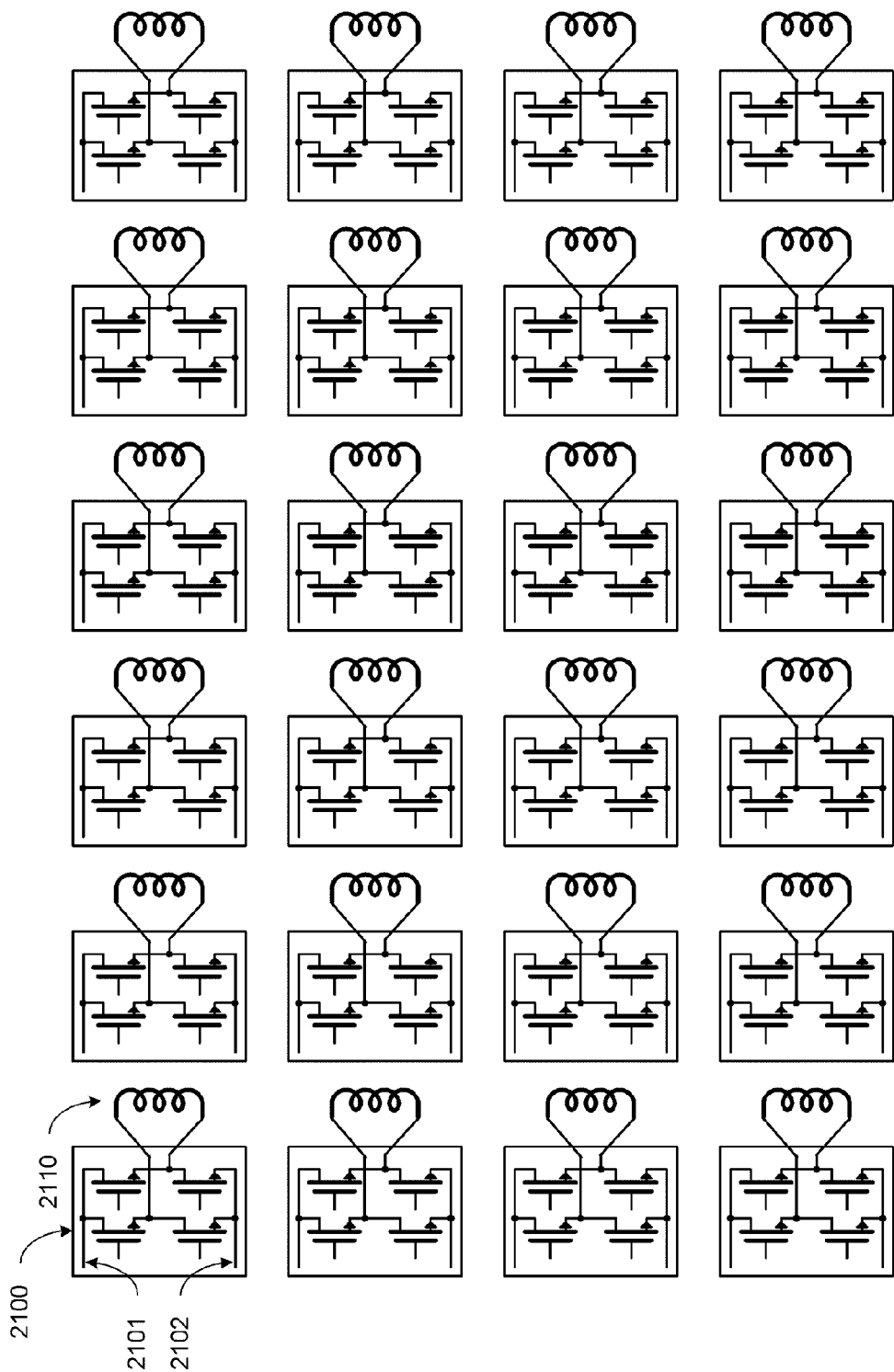
FIG. 21 is a schematic diagram of a switching circuit to change the polarity of charging pad coils, in accordance with some implementations.

FIG. 21 is a schematic diagram of a switching circuit to change the polarity of charging pad coils, in accordance with some implementations. Each coil 2110 may have an associated H-bridge switch 2100. In some aspects, the H-bridge switch may be made up of four power transistors or MOS-FETs arranged to connect the coil to the power rails 2101, 2102. In operation, two of the transistors may be active at a time. In some aspects, the upper left transistor may be turned on to connect the upper lead of the coil to the upper power rail 2101 while the lower right transistor may be turned on to connect the lower lead of the coil to the lower power rail 2102. The other two transistors may be turned off. In the other aspects, the upper right transistor may be turned on to connect the lower coil lead to the upper power rail 2101 while the lower left transistor may be turned on to connect the upper lead of the coil to the lower power rail 2102, changing the polarity of the coil connections. The other two transistors may be turned off.

Figure 22:
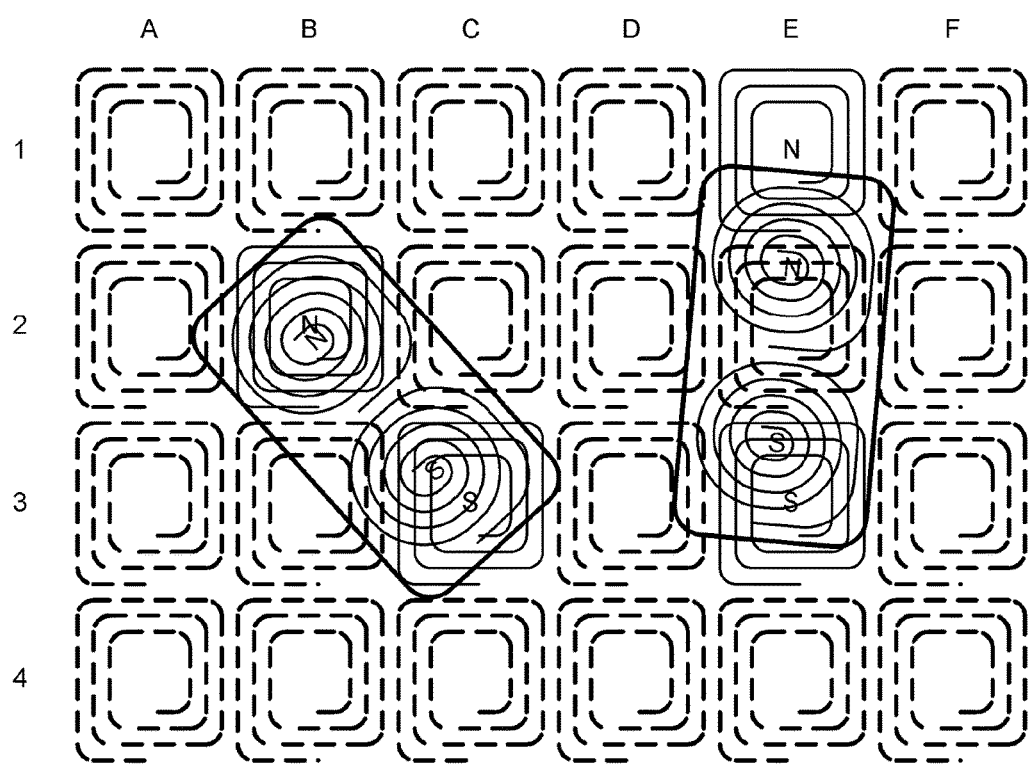
FIG. 22 is a schematic of a multi-coil charging pad and multiple devices in a wireless power system, in accordance with some implementations.

FIG. 22 is a schematic of a multi-coil charging pad and multiple devices in a wireless power system, in accordance with some implementations. One device may be coupled to charging pad coils B2 and C3 while a second device may be coupled to charging pad coils E1 and E3. Coil E1 may be used rather than coil E2. Charging pad coil E1 and the upper coil in the portable device may be misaligned, the magnetic circuit may still form in the closed loop as depicted in FIG. 10.

The coil polarity configurations illustrated in FIGS. 15, 16, 17, and 18 may not simultaneously satisfy the alignment of both devices shown in FIG. 22. In some aspects, the polarity of rows 2 and 4 may be rapidly switched while the portable devices alternately may turn off their coupling to the charging pad and may turn on when a particular polarity may be presented.

Figure 23:
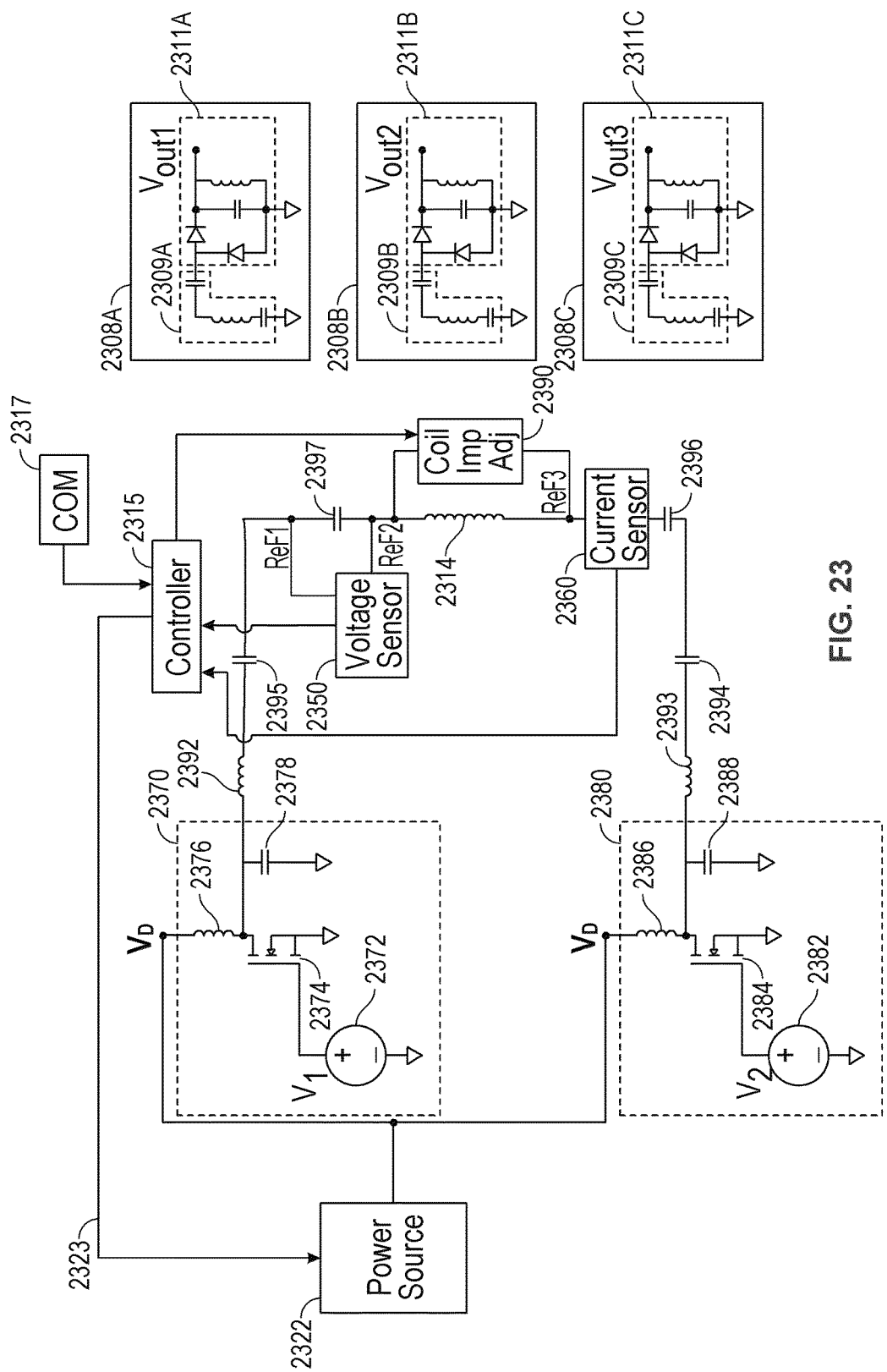
FIG. 23 is a wireless power transmitter which includes a power transfer sensing mechanism, in accordance with some implementations.

FIG. 23 is a wireless power transmitter which includes a power transfer sensing mechanism that may be used to determine a measure of coupling of power between coils or pairs of coils, in accordance with some implementations. Although FIG. 23 illustrates one transmit coil 2314, a plurality of transmit coils may be similarly configured and controlled by one or more controllers, such as the controller 2315. In combination, the plurality of transmit coils and one or more controllers may be configured to create a multi-coil charging pad, such as the charging pad 1500 illustrated in FIG. 15. Based on the measure of coupling between coils or pairs of coils in the multi-coil charging pad, the one or more controllers may be configured to select coils or pairs of coils for wireless power transmission, for instance, by energizing or de-energizing one or more coils as described in the discussion of FIG. 20. In some aspects, based on the measure of coupling between coils or pairs of coils in the multi-coil charging pad, the one or more controllers may be configured to reverse the polarity of one or more coils of the plurality of coils as described in the discussion of FIG. 22, for example.

As shown in FIG. 23, three wireless power receivers 2308A, 2308B, and 2308C may be configured to be coupled to a wireless field to receive power. Each of the wireless power receivers 2308A-2308C may include a resonant circuit (e.g., resonant circuits 2309A-2309C) having a wireless power receiver coil coupled to a one or more capacitors. The resonant circuits 2309A-2309C or each wireless power receiver 2308A-2308C are coupled to a rectification circuit (e.g., rectification circuits 2311A-2311C) to output a voltage at a voltage level for powering or charging a corresponding load (not shown). For example, the first wireless power receiver 2308A may be configured to output a voltage at a voltage level $V_{out1}$, the second wireless power receiver 2308B may be configured to output a voltage at a voltage level $V_{out2}$, and the third wireless power receiver 2308C may be configured to output a voltage at a voltage level $V_{out3}$. The voltage levels $V_{out1}$, $V_{out2}$, and $V_{out3}$ may be set to meet the load requirements coupled to each of the wireless power receivers 2308A-2308C.

Further, as shown in FIG. 23, a power source 2322 is configured to provide a voltage signal $V_D$ to each of a first and second driving circuit 2370 and 2380. For example, each of the first and second driving circuits 2370 and 2380 may be configured as class E amplifiers which are connected to drive a wireless power transmit coil 2314 in a push-pull configuration. The first driving circuit 2370 includes a first voltage source 2372 configured to generate a voltage signal at a voltage level $V_1$. The output of the first voltage source 2372 is coupled to a first switching circuit 2374. The first switching circuit 2374 is coupled to a voltage signal ($V_D$) terminal input to receive a power signal through an inductor 2376. The output of the first switching circuit 2374 is coupled to a wireless power field generating circuit through the first bypass capacitor 2378. Based on the relative value of voltage signal $V_D$ and the voltage level $V_1$, the first driving circuit 2370 is configured to inject current into the wireless power field generating circuit.

The second driving circuit 2380 includes similar components and functions similar to the first driving circuit 2370. For example, as shown in FIG. 23, the second driving circuit 2380 includes a second voltage source 2382 configured to generate a voltage signal at a voltage level $V_2$. The second voltage source 2382 is coupled to second switching circuit 2384. The second switching circuit 2384 is coupled to a voltage signal ($V_D$) terminal input to receive power signal through an inductor 2386. The output of the second switching circuit 2384 is coupled to wireless power field generated circuit through the second bypass capacitor 2388. Based on the relative value of voltage signal $V_D$ and the voltage level $V_2$, the second driving circuit 2380 is configured to inject current into the wireless power field generating circuit.

A current from the first and second driving circuit and 2370 and 2380 is received by a wireless power transmit coil 2314 to generate the wireless power transfer field. The wireless power transmit coil 2314 is coupled to each of the first and second driving circuit 2370 and 2380 through first and second inductive components 2392 and 2393, and first through fourth capacitive components 2394-2397. The inductive components 2392, 2393, and capacitive components 2394-2397 may be coupled to the wireless power transmit coil 2314 to form a resonant circuit. As shown in FIG. 23, the wireless power transmit coil 2314 is also coupled to coil impedance adjustment circuit 2390, a current sensor 2360, and a voltage sensor 2350. While shown to include each of a current sensor 2360, voltage sensor 2350, and coil impedance adjustment circuit 2390, the transmit circuitry may also include any combination of these components including, for example, only one of these components. Further, various components illustrated and/or described in FIG. 23 and additional components may be included or excluded based on the functionality of a wireless power transmitter.

As shown in FIG. 23, the coil impedance adjustment circuit 2390 may be configured to adjust the impedance of the wireless power transmit coil based on a signal received from controller 2315 in order to control the amount of current flowing through the wireless power transmit coil 2314. The current sensor 2316 may be coupled to the wireless power transmit coil 2314 in series, and may be configured to detect the level of current passing through the wireless power transmit coil 2314 and communicate the sensed level of current to the controller 2315. The voltage sensor 2350 may be configured to detect a voltage level at the input of wireless power transmit coil 2314 and communicate the detected voltage level to the controller 2315. Additionally, or alternatively, the voltage sensor 2350 may be configured to detect a voltage level (ReF1, ReF2) across an impedance (e.g., capacitive component 2397 as shown in FIG. 23) and communicate the detected voltage difference to the controller 2315. The controller 2315 may be configured to determine a current through the wireless power transmit coil 2314 based on the detected voltage levels (e.g., ReF1 and ReF2). Further, the voltage sensor 2350 may be configured to detect a voltage level across the transmit coil 2314 (e.g., a voltage equal to ReF2-ReF3) and transmit the detected voltage level to the controller 2315. Other voltage measurements and current measurements may also be performed and provided to the controller 2315, and the illustrated examples of FIG. 23 are provided only as example measurement positions.

The controller 2315 may be configured to adjust a parameter of the transmit circuitry, for example by adjustment of one or more of an effective impedance of the transmit coil 2314 (e.g. through control of the coil impedance adjustment circuit 2390) and the level of the drive voltage $V_D$ to maintain a constant current through the coil 2314 or a constant voltage at the transmit coil 2314. Further, the controller 2315 may be configured to determine a measure of coupling of power between coils or pairs of coils based on the product of the detected voltage level across the transmit coil 2314 and determined current through the transmit coil 2314, for example. In some aspects, as another example, the controller 2315 may be configured to determine a measure of coupling of power between coils or pairs based on fluctuations in the detected current through the transmit coil 2314. Based in part on the measure of coupling of power between coils or pairs of coils, the controller 2315 may selectively energize or de-energize the transmit coil 2314 (e.g., by sufficiently decreasing the current through the transmit coil 2314) or reverse polarity of the magnetic field of the transmit coil 2314.

According to some implementations, the controller 2315 may be configured to generate an internal or local feedback signal to adjust one of the current through the wireless power transmit coil 2314 and the voltage at the input of the wireless power transmit coil 2314. For example, the controller 2315 may also be configured to provide a feedback signal 2323 (e.g., a local or internal feedback signal) for controlling the voltage level of the power signal generated by the power source 2322. Additionally, or alternatively, the controller 2315 may be configured to generate a feedback signal (e.g., a local or internal feedback signal) to adjust the effective impedance of the wireless power transmit coil 2314 by adjusting the impedance of the coil impedance adjustment circuit 2390. The controller 2315 may be configured to control a set of switches of the coil impedance adjustment circuit 2390 which are configured to connect one or more reactive and resistive elements in parallel or series with the wireless power transmit coil 2314. If the current measurement is lower than a predetermined threshold the switches will be configured to reduce the impedance of the primary winding. In this way, the controller 2315 may be configured to maintain constant level of current through the wireless power transmit coil 2314 in the presence of a plurality of wireless power receivers 2308A-2308C and different loading conditions as discussed above. Alternatively, the controller 2315 may be configured to maintain constant voltage level at the input of the wireless power transmit coil 2314 in the presence of a plurality of wireless power receivers 2308A-2308C and different loading conditions as discussed above.

Further, a wireless power transmitter may include a communication module 2317 coupled to the controller 2315. The communication module 2317 may be configured to receiver communication signals from one or more of the wireless power receivers 2308A-2308C. Based on the communication signals, the controller 2315 may also determine an adjustment of one of the currents through wireless power transmit coil 2314 and a voltage at the input of the wireless power transmit coil. For example, the wireless power receivers 2308A-2308C may provide feedback to the controller 2315 based on the power received by each of the wireless power receivers 2308A-2308C and the requirements of each of the wireless power receivers 2308A-2308C. In some implementations, the controller 2315 may use the communication signals received from the wireless power receivers 2308A-2308C to adjust a set-point for one of the current and voltage of the wireless power transmit coil 2314. The controller 2315 may also use the local or internal feedback (e.g., based on signals received from the voltage sensor 2350 and current sensor 2360) to adjust one of the voltage and current of the wireless power transmit coil 2314. For example, the controller 2315 may be configured to perform a coarse adjustment based on signals received from the wireless power receivers 2308A-2308C, and a fine adjustment based on signals received from the voltage sensor 2350 or the current sensor 2360.

Figure 24:
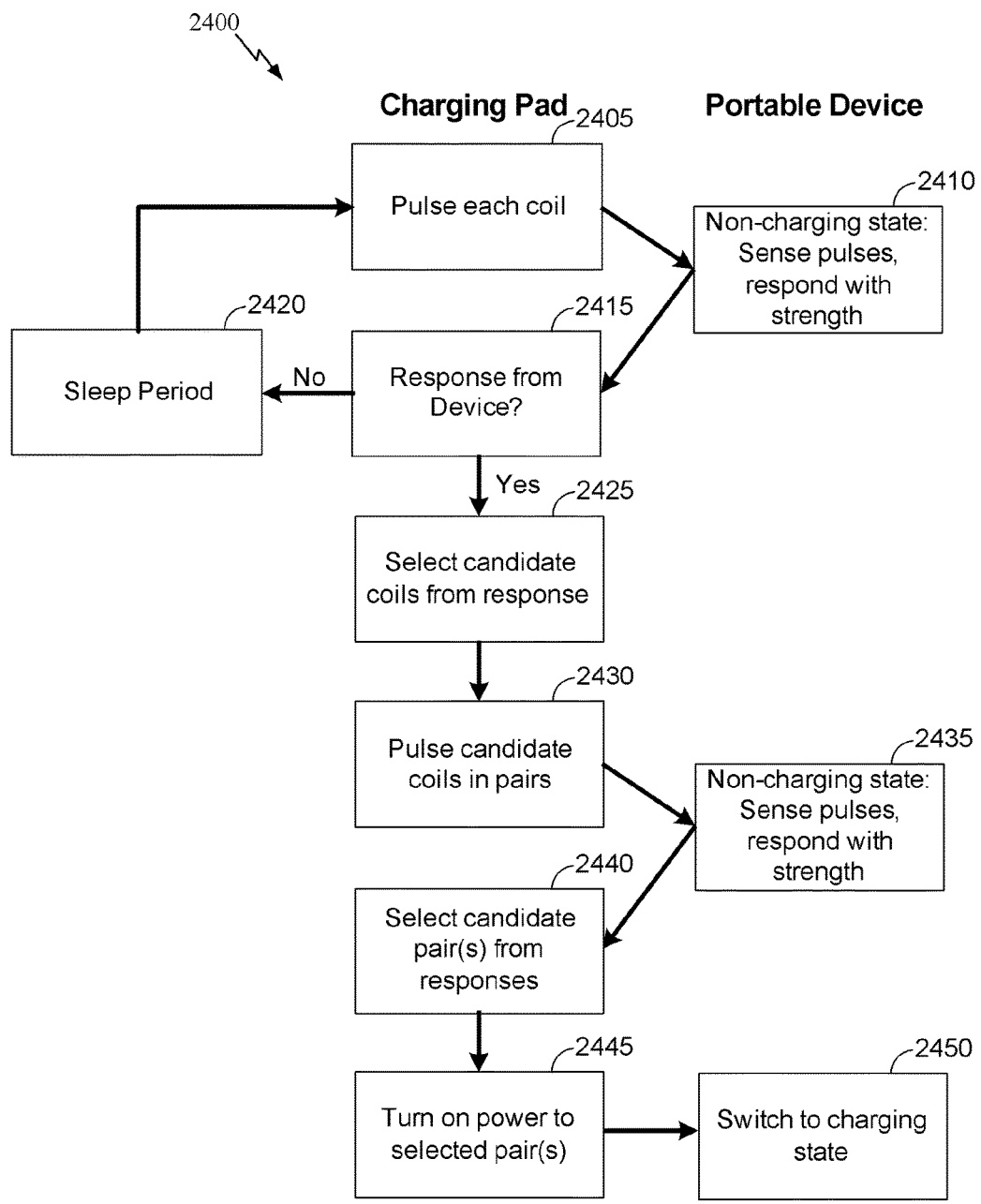
FIG. 24 is a flowchart of an alignment discovery logic for a charging pad, in accordance with some implementations.

FIG. 24 is a flowchart of an alignment discovery logic 2400 for a charging pad, in accordance with some implementations. Using the alignment discovery logic 2400, the charging pad may determine which charging pad coils to energize to couple to one or more portable devices placed on the charging pad.

At block 2405, the charging pad may use low power pulses to each coil or configuration of coils to determine whether a coil or configuration may be coupling with a device. At block 2410, the device may sense the power pulses and respond with the strength of coupling. At blocks, 2415 and 2420, if the charging pad may determine that a particular coil or configuration may not be coupling, the charging pad may turn off the coil or configuration for a duration of time to save power, for example. In some aspects, the duration of time may be predetermined. After the duration of time passes, the charging pad may repeat the low power pulses to each coil or coil configuration.

At blocks 2415 and 2425, if the charging pad determines that a particular coil or configuration of coils may couple power to the device, the charging pad may select candidate coils for wireless power transmission. At block 2430, the candidate coils may be pulsed in pairs. At block 2435, the device may sense the power pulses and respond with the strength of coupling. At block 2440, the charging pad may determine particular candidate pairs of coils that may result in a greater transfer of power than other candidate pairs of coils and select those particular candidate pairs for wireless transfer of power. At blocks 2445 and 2450, power may be turned on to the selected candidate pairs, and the device may switch to a charging state.

In some aspects, the portable device may connect a nominal load to each portable device coil when in a non-charging state (e.g., when not on a charging pad). The portable device may be placed on a charging pad while in a non-charging state, and the nominal load may accept some power from the charging pad.

In some aspects, the portable device may communicate power coupled by each coil and reactance modulate the low power pulses from the charging pad. The nominal load may be connected and disconnected in a pattern to signal the coupling strength and provide a measure of coupling between coils. In some aspects, the coupling strength may be communicated over a communication link 1470 shown in FIG. 14. In yet other aspects, the charging pad may measure the voltage or current in the charging pad coils and sense which coils may couple power to the portable device. The charging pad may sense a load and select a combination of coils or coil configuration and may turn on charging power. The portable device may use power coupled from the charging pad to charge a battery or power the device. In some aspects, the portable device may switch from charging the battery to powering the device, or vice versa. In some aspects, the alignment discovery logic 2400 may be used in a device 702 to control the receipt of power by the individual coils of the device.

Figure 25:
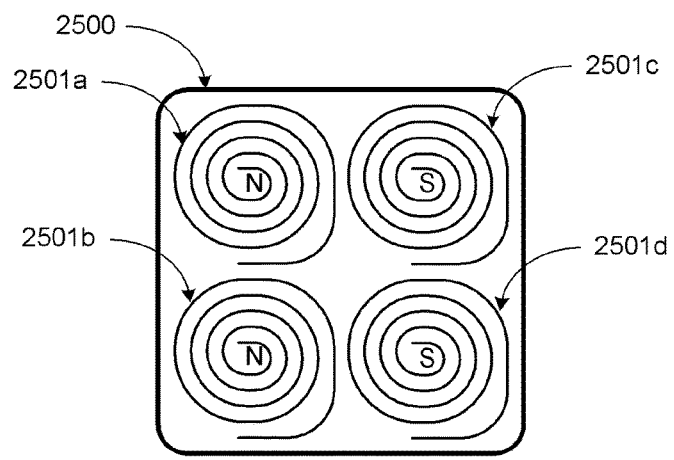
FIG. 25 is a schematic of a wirelessly chargeable device, in accordance with some implementations.

FIG. 25 is a top view of a schematic of a wirelessly chargeable device 2500, such as device 702 of FIG. 7, in accordance with some implementations. The number of coils in the portable device may be increased to four (e.g., coils 2501a, 2501b, 2501c, and 2501d). In other aspects, the number of coils may be increased to larger numbers. Increasing the number of coils may improve delivery of power to larger or power hungry devices and may increase the chances of efficient coupling of coils.

Figure 26:
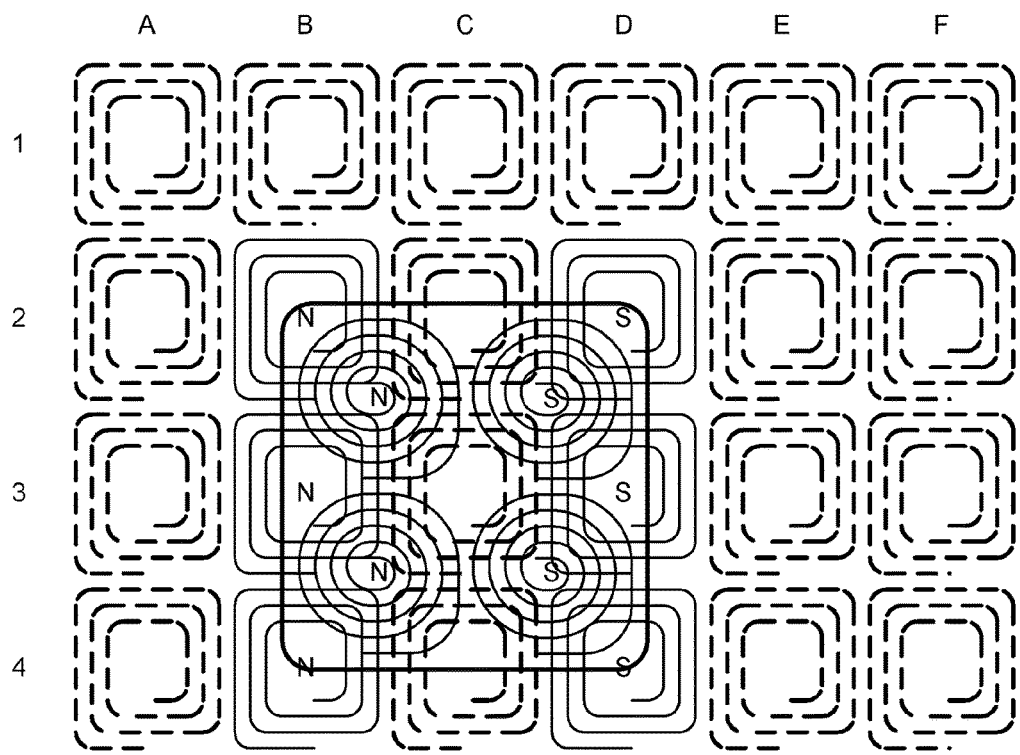
FIG. 26 is a schematic of a multi-coil charging pad and device in a wireless power system, in accordance with some implementations.

FIG. 26 is a schematic of a multi-coil charging pad and device in a wireless power system, in accordance with some implementations. FIG. 26 illustrates portable device of FIG. 25 atop a charging pad where the portable device may be centered at the intersection between four charging pad coils. In this configuration, the charging pad coils B2, B3, and B4 may provide the north polarity, column C may be turned off because of the overlap between opposite polarity coils in the portable device, and charging pad coils D2, D3 and D4 may provide the south polarity. In other aspects, different charging pad coils may be turned on or off.

Figure 27:
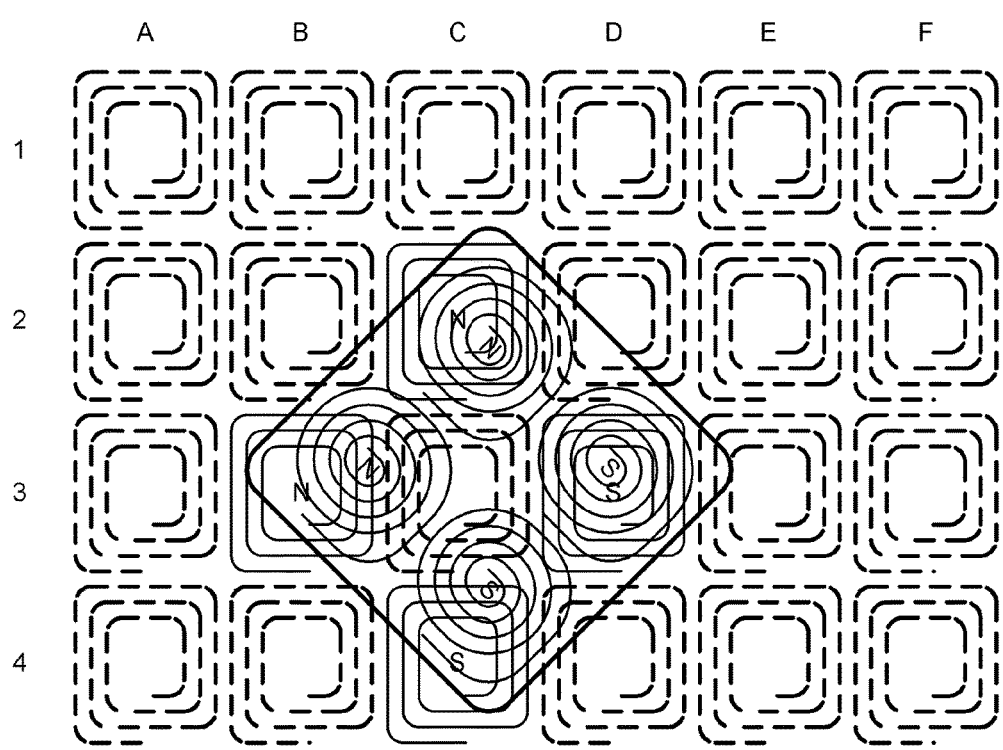
FIG. 27 is a schematic of another multi-coil charging pad and device in a wireless power system, in accordance with some implementations.

FIG. 27 is a schematic of a multi-coil charging pad and device in a wireless power system, in accordance with some implementations. FIG. 27 illustrates portable device of FIG. 25 atop a charging pad where the portable device may be placed diagonally on the charging pad. In this configuration, the charging pad coil C3 may be turned off while charging pad coils B3 and C2 may provide the north polarity and charging pad coils C4 and D3 may provide the south polarity. In other aspects, different charging pad coils may be turned on or off.

Figure 28:
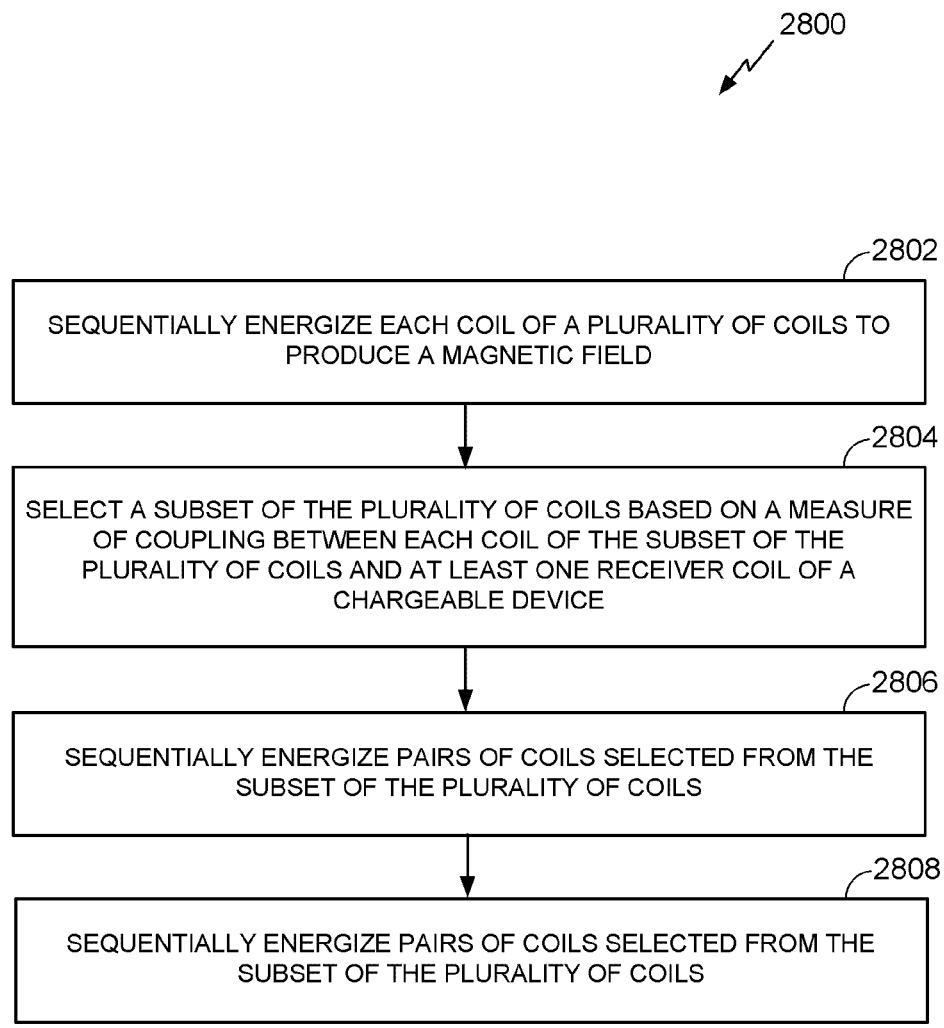
FIG. 28 is flowchart of a method of transmitting wireless power, in accordance with some implementations.

FIG. 28 is flowchart of a flowchart 2800 of transmitting wireless power in accordance with aspects, in accordance with some implementations. The flowchart 2800 may be used to transmit power wirelessly from a charging pad as illustrated in FIG. 7, for example. Although the flowchart 2800 is described below with respect to the elements of the Figures contained in this disclosure, those having ordinary skill in the art will appreciate that other components may be used to implement one or more of the steps described herein. In some non-limiting embodiments, a method including one or more of the blocks described in connection with flowchart 2800 may be performed by the controller 415 and/or other components of the transmitter 404, for example. Furthermore, certain blocks of flowchart 2800 may correspond to particular blocks of discovery logic 2400 as previously described in connection with FIG. 24. Although the method of flowchart 2800 is described herein with reference to a particular order, in various embodiments, blocks herein may be performed in a different order, or omitted, and additional blocks may be added.

The flowchart 2800 may begin with block 2802, which includes sequentially energizing each coil of a plurality of coils to produce a magnetic field. For example, the controller 415 of the transmitter 400 of FIG. 4 (and/or any of the circuitry previously described in connection with FIGS. 14, 19 and 21) may be configured to sequentially energize each coil of the plurality of coils to produce a magnetic field (see, e.g., any of FIGS. 15-18, 20 and 22). In some implementations, the controller 415 may also be known as, or comprise at least a portion of "means for sequentially energizing each coil of the plurality of coils to produce a magnetic field." Flowchart 2800 may advance to block 2804.

Block 2804 includes selecting a subset of the plurality of coils based on a measure of coupling between each coil of the subset of the plurality of coils and at least one receiver coil of a chargeable device. In some implementations, the measure of coupling between each coil of the subset of the plurality of coils and the at least one receiver coil of the chargeable device is a measure of coupling of power. For example, the controller 415 of the transmitter 400 of FIG. 4 (and/or any of the circuitry previously described in connection with FIGS. 14, 19 and 21) may be configured to select a subset of the plurality of coils based on a measure of coupling between each coil of the subset of the plurality of coils and at least one receiver coil of a chargeable device. In some implementations, the controller 415 may also be known as, or comprise at least a portion of "means for selecting a subset of the plurality of coils based on a measure of coupling between each coil of the subset of the plurality of coils and at least one receiver coil of a chargeable device." Flowchart 2800 may advance to block 2806.

Block 2806 includes sequentially energizing pairs of coils selected from the subset of the plurality of coils. For example, the controller 415 of the transmitter 400 of FIG. 4 (and/or any of the circuitry previously described in connection with FIGS. 14, 19 and 21) may be configured to sequentially energize pairs of coils selected from the subset of the plurality of coils. In some implementations, the controller 415 may also be known as, or comprise at least a portion of "means for sequentially energizing pairs of coils selected from the subset of the plurality of coils." Flowchart 2800 may advance to block 2806.

Block 2808 includes selecting at least two coils from the subset of the plurality of coils for wireless power transmission based on a measure of coupling between each of the pairs of coils and the at least one receiver coil of the chargeable device. In some implementations, the measure of coupling between each of the pairs of coils and the at least one receiver coil of the chargeable device is a measure of coupling of power. Moreover, in some implementations, the at least two coils from the subset of the plurality of coils and the at least one receiver coil of the chargeable device form a closed magnetic loop. Furthermore, as previously described in connection with any of FIGS. 15-18, 20 and 22, the at least two coils from the subset of the plurality of coils and the at least one receiver coil of the chargeable device form a closed magnetic loop. Thus, each coil of the plurality of coils may be configured to have an opposite magnetic polarity compared to a directly adjacent coil. Specifically, in some implementations, a first coil of each of the pairs of coils is energized with an opposite magnetic polarity compared to a second coil of each of the pairs of coils. In some other implementations, the controller may be further configured to cause a polarity of a row of coils or of a column of coils to be the same polarity (see FIG. 18). For example, the controller 415 of the transmitter 400 of FIG. 4 (and/or any of the circuitry previously described in connection with FIGS. 14, 19 and 21) may be configured to select at least two coils from the subset of the plurality of coils for wireless power transmission based on a measure of coupling between each of the pairs of coils and the at least one receiver coil of the chargeable device. In some implementations, the controller 415 may also be known as, or comprise at least a portion of "means for selecting at least two coils from the subset of the plurality of coils for wireless power transmission based on a measure of coupling between each of the pairs of coils and the at least one receiver coil of the chargeable device." In some implementations, the controller 415 may also be known as, or comprise at least a portion of "means for causing a polarity of each coil of the plurality of coils to have an opposite magnetic polarity compared to a directly adjacent coil."

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus' for wireless power transmission, comprising:
   a plurality of coils; and
   a controller configured to:
      sequentially energize each coil of the plurality of coils to produce a magnetic field,
      select a subset of the plurality of coils based on a measure of coupling between each coil of the subset of the plurality of coils and at least one receiver coil of a chargeable device,
      sequentially energize pairs of coils selected from the subset of the plurality of coils, and
      select at least two coils from the subset of the plurality of coils for wireless power transmission based on a measure of coupling between each of the pairs of coils and the at least one receiver coil of the chargeable device.

2. The apparatus of claim 1, wherein:
   the measure of coupling between each coil of the subset of the plurality of coils and the at least one receiver coil of the chargeable device is a measure of coupling of power; and
   the measure of coupling between each of the pairs of coils and the at least one receiver coil of the chargeable device is a measure of coupling of power.

3. The apparatus of claim 1, wherein the at least two coils from the subset of the plurality of coils and the at least one receiver coil of the chargeable device form a closed magnetic loop.

4. The apparatus of claim 1, wherein a first coil of each of the pairs of coils is energized with an opposite magnetic polarity compared to a second coil of each of the pairs of coils.

5. The apparatus of claim 1, wherein each coil of the plurality of coils is configured to have an opposite magnetic polarity compared to a directly adjacent coil.

6. The apparatus of claim 1, wherein the controller is further configured to cause a polarity of a row of coils or of a column of coils to be the same polarity.

7. The apparatus of claim 1, wherein the controller is further configured to cause a polarity of each coil of the plurality of coils to have an opposite magnetic polarity compared to a directly adjacent coil.

8. A method for wireless power transmission, comprising:
sequentially energizing each coil of a plurality of coils to produce a magnetic field,
selecting a subset of the plurality of coils based on a measure of coupling between each coil of the subset of the plurality of coils and at least one receiver coil of a chargeable device,
sequentially energizing pairs of coils selected from the subset of the plurality of coils, and
selecting at least two coils from the subset of the plurality of coils for wireless power transmission based on a measure of coupling between each of the pairs of coils and the at least one receiver coil of the chargeable device.

9. The method of claim 8, wherein:
the measure of coupling between each coil of the subset of the plurality of coils and the at least one receiver coil of the chargeable device is a measure of coupling of power; and
the measure of coupling between each of the pairs of coils and the at least one receiver coil of the chargeable device is a measure of coupling of power.

10. The method of claim 8, wherein the at least two coils from the subset of the plurality of coils and the at least one receiver coil of the chargeable device form a closed magnetic loop.

11. The method of claim 8, wherein a first coil coil of each of the pairs of coils is energized with an opposite magnetic polarity compared to a second coil of each of the pairs of coils.

12. The method of claim 8, wherein each coil of the plurality of coils is configured to have an opposite magnetic polarity compared to a directly adjacent coil.

13. The method of claim 8, wherein the controller is further configured to cause a polarity of a row of coils or of a column of coils to be the same polarity.

14. The method of claim 8, wherein the controller is further configured to cause a polarity of each coil of the plurality of coils to have an opposite magnetic polarity compared to a directly adjacent coil.

15. An apparatus for wireless power transmission, comprising:
means for sequentially energizing each coil of a plurality of coils to produce a magnetic field,
means for selecting a subset of the plurality of coils based on a measure of coupling between each coil of the subset of the plurality of coils and at least one receiver coil of a chargeable device,
means for sequentially energizing pairs of coils selected from the subset of the plurality of coils, and
means for selecting at least two coils from the subset of the plurality of coils for wireless power transmission based on a measure of coupling between each of the pairs of coils and the at least one receiver coil of the chargeable device.

16. The apparatus of claim 15, wherein:
the measure of coupling between each coil of the subset of the plurality of coils and the at least one receiver coil of the chargeable device is a measure of coupling of power; and
the measure of coupling between each of the pairs of coils and the at least one receiver coil of the chargeable device is a measure of coupling of power.

17. The apparatus of claim 15, wherein the at least two coils from the subset of the plurality of coils and the at least one receiver coil of the chargeable device form a closed magnetic loop.

18. The apparatus of claim 15, wherein a first coil of each of the pairs of coils is energized with an opposite magnetic polarity compared to a second coil of each of the pairs of coils.

19. The apparatus of claim 15, wherein each coil of the plurality of coils is configured to have an opposite magnetic polarity compared to a directly adjacent coil.

20. The apparatus of claim 15, further comprising means for causing a polarity of each coil of the plurality of coils to have an opposite magnetic polarity compared to a directly adjacent coil.

* * * * *